US011799311B2

United States Patent
Quek et al.

(10) Patent No.: US 11,799,311 B2
(45) Date of Patent: Oct. 24, 2023

(54) CURRENT SHARING FOR MULTI-OUTPUT CHARGING DEVICE

(71) Applicant: Power Integrations, Inc., San Jose, CA (US)

(72) Inventors: Eng Hwee Quek, Singapore (SG);
Aditya Jayant Kulkarni, Shrewsbury, MA (US); Ran Li, Shenzen (CN);
Roland Sylvere Saint-Pierre, San Jose, CA (US)

(73) Assignee: POWER INTEGRATIONS, INC., San Jose, CA (US)

( * ) Notice: Subject to any disclaimer, the term of this patent is extended or adjusted under 35 U.S.C. 154(b) by 470 days.

(21) Appl. No.: 17/106,507

(22) Filed: Nov. 30, 2020

(65) Prior Publication Data

US 2021/0083500 A1    Mar. 18, 2021

Related U.S. Application Data

(63) Continuation of application No. PCT/CN2019/101831, filed on Aug. 21, 2019.

(51) Int. Cl.
*H02J 7/00* (2006.01)
*H02J 7/02* (2016.01)

(52) U.S. Cl.
CPC ........ *H02J 7/00712* (2020.01); *H02J 7/0019* (2013.01); *H02J 7/02* (2013.01); *H02J 2207/20* (2020.01)

(58) Field of Classification Search
CPC .................................................. H02J 7/00712

(Continued)

(56) References Cited

U.S. PATENT DOCUMENTS

| 4,035,715 A | 7/1977 | Wyman et al. |
| 6,850,048 B2 | 2/2005 | Orr et al. |

(Continued)

FOREIGN PATENT DOCUMENTS

| CN | 104049703 A | 9/2014 |
| CN | 106532912 A | 3/2017 |
| CN | 207518330 U | 6/2018 |

OTHER PUBLICATIONS

PCT Application No. PCT/CN2019/101831; International Preliminary Report on Patentability; dated Mar. 3, 2022; 6 pages.

*Primary Examiner* — Yalkew Fantu
(74) *Attorney, Agent, or Firm* — POWER INTEGRATIONS, INC.; Karina Martha G. Li

(57) ABSTRACT

A charging device comprising a first power converter configured to provide a first output power, a second power converter configured to provide a second output power. A switch is coupled to the first power converter and the second power converter. A first socket is configured to deliver the first output power from the first power converter to a first powered device. A second socket is configured to deliver the second output power from the second power converter to a second powered device. A power delivery (PD) controller configured to detect a coupling of the first socket to the first powered device. In addition, the PD controller is configured to detect an absence of coupling of the second socket to the second powered device. Furthermore, the PD controller is configured to control the switch to provide the first output power and the second output power to the first powered device.

38 Claims, 10 Drawing Sheets

(58) Field of Classification Search
USPC .......................................................... 320/121
See application file for complete search history.

(56) References Cited

U.S. PATENT DOCUMENTS

| | | |
|---|---|---|
| 6,879,139 B2 | 4/2005 | Brown et al. |
| 7,301,317 B1 | 11/2007 | Mattingly |
| 7,489,120 B2 | 2/2009 | Matthews |
| 7,564,229 B2 | 7/2009 | Odell |
| 7,675,761 B2 | 3/2010 | Cuadra et al. |
| 7,759,914 B2 | 7/2010 | Odell et al. |
| 8,466,662 B2 | 6/2013 | Nania et al. |
| 9,331,587 B2 | 5/2016 | Djenguerian et al. |
| 9,444,278 B2 | 9/2016 | Baurle |
| 9,467,136 B1 | 10/2016 | Nguyen |
| 9,570,984 B2 | 2/2017 | Yang et al. |
| 10,008,942 B1 | 6/2018 | Horwitz et al. |
| 10,141,765 B2 | 11/2018 | Balakrishnan et al. |
| 10,148,183 B1 | 12/2018 | Peng et al. |
| 10,277,136 B2 | 4/2019 | Werner et al. |
| 2003/0085621 A1* | 5/2003 | Potega ..................... G06F 1/26 307/18 |
| 2006/0055433 A1* | 3/2006 | Yang ................. H02M 3/33507 327/10 |
| 2016/0094131 A1* | 3/2016 | Bäurle ................... H02M 1/32 363/21.17 |
| 2019/0348923 A1* | 11/2019 | Dai ....................... H02M 3/155 |
| 2020/0195148 A1* | 6/2020 | Wen .......................... H02J 7/02 |

\* cited by examiner

CURRENT SHARING FOR MULTI-OUTPUT CHARGING DEVICE

CROSS-REFERENCE TO RELATED APPLICATIONS

This application is a continuation application of International Patent Application No. PCT/CN2019/101831, filed on Aug. 21, 2019, currently pending. International Patent Application No. PCT/CN2019/101831 is incorporated herein by reference in its entirety.

BACKGROUND INFORMATION

Field of the Disclosure

The present invention relates generally to providing a powered device with power that is generated by one or more power converters in a charging device.

BACKGROUND

Electronic devices (such as cell phones, tablets, laptops, etc.) use power to operate. Switched mode power converters are commonly used due to their high efficiency, small size, and low weight to power many of today's electronics. Conventional wall sockets provide a high voltage alternating current. In a switching power converter, a high voltage alternating current (ac) input is converted to provide a well-regulated direct current (dc) output through an energy transfer element to a load. In operation, a switch is utilized to provide the desired output by varying the duty cycle (typically the ratio of the ON time of the switch to the total switching period), varying the switching frequency, or varying the number of pulses per unit time of the switch in a switched mode power converter.

A charging device may be coupled to a wall socket to receive an ac input and includes a power converter which generates a dc output provided to a load. Power may be provided to electronic devices, which may also be referred to as powered devices, through a cable, such as a Universal Serial Bus (USB) cable. The powered device may be powered and/or charged through the charging device. The powered device typically includes a rechargeable battery, and the switched mode power converter typically charges the battery in addition to providing power to operate the powered device. Typically, a cable connects to the charging device and the powered device utilizing a plug interface. Each end of the cable may have a plug that connects to a respective socket of the charging device or the powered device.

A charging device with multiple sockets may be configured to charge multiple powered devices. The charging device may comprise one or more power converters that receive an ac input voltage, and provide a dc output to the powered devices. An output voltage multiplied by the output current is defined as the output power. In general, the amount of power that each power converter may provide to the powered device via the socket can be described by an assured power condition and a shared power condition. In one example, assured power can be described as a minimum amount of power the power converter can provide to the powered device. In a further example, shared power can be described as a maximum amount of power the power converter can provide to the powered device.

Typically, for the charging device configured to charge two powered devices, the charging device includes a two stage power converter. In one example, the first stage of the power converter can include a flyback converter. The output of the first stage is used as the input to a second stage power converter, which can include a buck or a buck\boost converter. Each second stage power converter is optimally designed to provide the shared power to the powered device when a single powered device is plugged in. However, when both powered devices are plugged in, the charging device is configured to only provide the assured power, which is significantly less than the shared power. The efficiency of the two stage power converter can be computed as the reciprocal of the efficiency of the first stage power converter multiplied by the reciprocal of the efficiency of the second stage power converter. Having a two stage power converter can decrease the overall efficiency, which can increase the heat dissipation of the charging device. To dissipate the heat, the charging device may include a heatsink to dissipate the heat. As a result, the design of the overall charging device increases in size and cost.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1A:
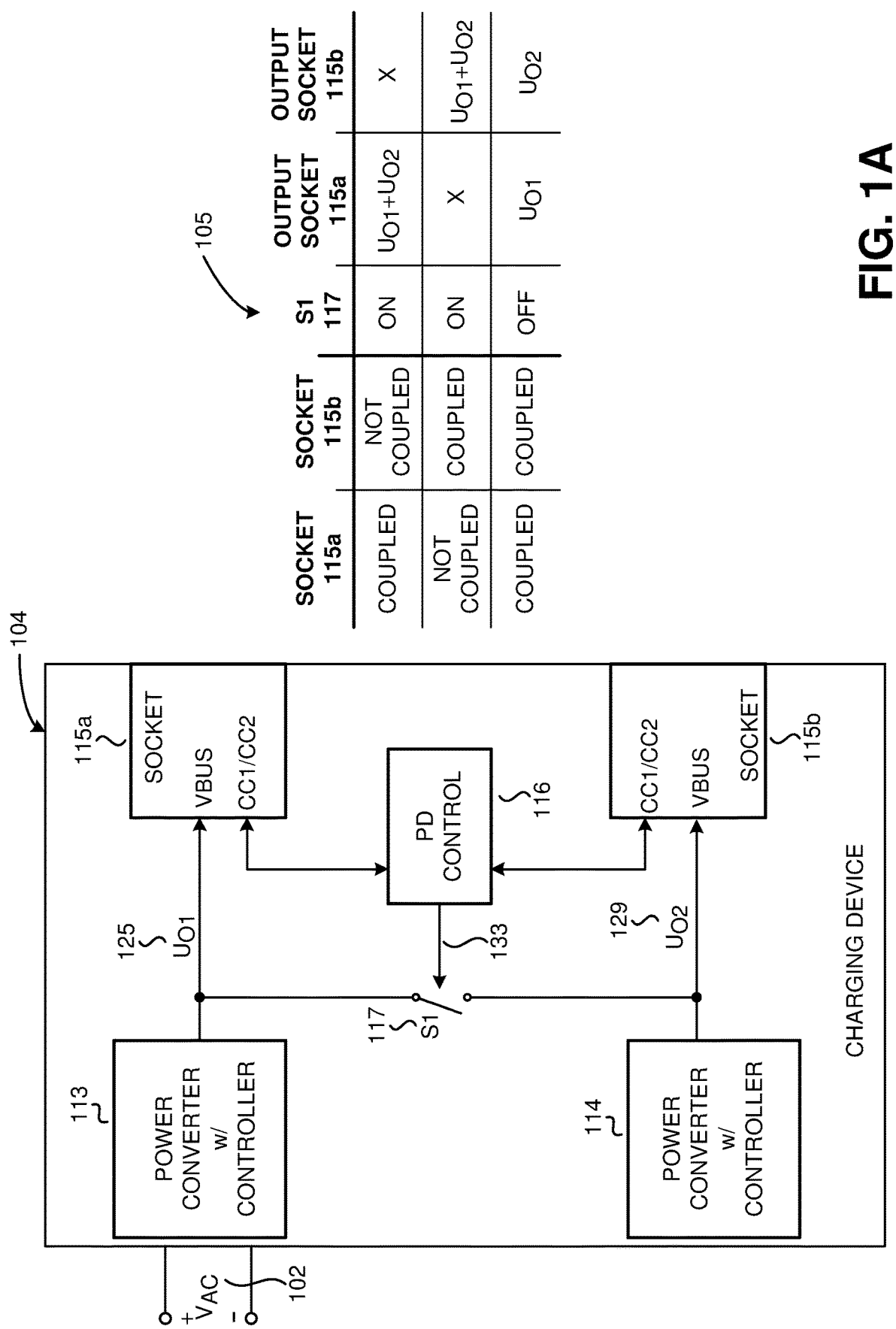
FIG. 1A illustrates an example of a multiple output charging device which includes multiple power converters and a bidirectional switch that is controlled by a power delivery (PD controller), in accordance with embodiments of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of providing a powered device with an output power that is generated by one or more power converters in a charging device are described herein. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment," "an embodiment," "one example," or "an example" means that a particular feature, structure or characteristic described in connection with the embodiment or example is included in at least one embodiment of the present invention. Thus, appearances of the phrases "in one embodiment," "in an embodiment," "one example," or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Embodiments include a charging device with a single-stage power converter that is configured to charge multiple powered devices. The charging device may be referred to as a multiple output power converter which supplies power to multiple powered devices. The charging device may include multiple single-stage power converters where each output may be coupled to a powered device. In one example, the single-stage converter is a flyback converter. Functionally, the charging device is configured to provide shared power to the powered device when a single powered device is plugged in through one socket, and is further configured to provide the assured power when multiple powered devices are plugged through multiple sockets. By utilizing a single-stage power converter in accordance with embodiments of the present disclosure, there may be an increase in efficiency relative to the two stage power converter. Each single-stage power converter can be designed to provide the assured amount of power. As a result, the overall design of the charging device may decrease in size and cost such as eliminating the heatsink. As will be further discussed herein in accordance with embodiments of the present disclosure, each single-stage power converter can be used together to provide the shared power.

In some embodiments, the charging device may include a microcontroller which monitors a socket to determine if a powered device is plugged in. The powered device and microcontroller can negotiate the power delivery of the charging device to the powered device. One example of a microcontroller which is configured to be compatible with the USB Power Delivery (PD) standard, will be referred as a PD controller. The PD controller can communicate to the singlestage power converter to adjust the output voltage, the output current, or both the output voltage and the output current as a result of agreed upon power delivery. A change in either or both the output voltage and the output current may be referred to as a change in output power.

In some embodiments, when one powered device is connected to any of the sockets, the powered device and PD controller can negotiate the power delivery of the charging device to the powered device up to the shared output power. In some embodiments, the charging device further includes a bidirectional switch that is controlled by the microcontroller. In some embodiments, the charging device can deliver the shared output power by enabling the bidirectional switch to couple each of the single-stage power converters together. The total output power delivered from the charging device to the powered device can be a sum of the first output power and the second output power. In order words, total output delivered may be the shared output power from the multiple single-stage power converters.

When all sockets of the charging device are connected to powered devices, the powered devices and microcontroller negotiate the power delivery of the charging device to each powered device up to the assured amount of power. In some embodiments, the microcontroller disables the bidirectional switch to decouple each single-stage power converter.

The microcontroller may be configured to control the single-stage power converters in order to adjust/regulate the output voltage, the output current, or both the output voltage and the output current. In some embodiments, each single-stage power converter includes a power converter controller. The microcontroller can communicate to the power converter controller to change any of the output parameters mentioned above, as well as read from the power controller any of the output parameters of the single-stage power converters.

When the total output power delivered from the charging device to the powered device is the sum of the first output power and the second output power, the microcontroller may determine if the first output power and second output are equal with hysteresis. If the first output power or second output power are not equal with hysteresis, the PD controller can communicate to the power converter controllers to change one of the output parameters until the first output power and the second output power are equal with hysteresis.

To illustrate, FIG. 1A comprises a charging device 104 configured to charge one or more powered devices, in accordance with embodiments of the present disclosure. As illustrated, the charging device 104 comprises a first power converter 113, a second power converter 114, a first socket 115a, a second socket 115b, a power delivery (PD) controller 116, and a bidirectional switch 117.

The first power converter 113 is configured to receive an ac input $V_{AC}$ 102, and outputs a first output power $U_{O1}$ 125. The output of the first power converter 113 may be regulated by a first power converter controller. The second power converter 114 is also configured to receive an ac input $V_{AC}$ 102, and outputs a second output power $U_{O2}$ 129. The output of the second power converter 114 may be regulated by a second power converter controller.

The first socket 115a comprises a voltage bus (VBUS) terminal and a first configuration (CC1) and a second configuration (CC2) terminals. In the embodiment shown, the charging device 104 may deliver the first output power $U_{O1}$ 125 through the VBUS terminal. The second socket 115b also comprises a VBUS terminal and a first configuration channel (CC1) and a second configuration channel (CC2) terminals. In the embodiment shown, the charging device 104 may deliver the second output power $U_{O2}$ 129 through the VBUS terminal.

In the embodiment shown, PD controller 116 is configured to detect the coupling of the first socket 115a or the coupling of the second socket 115b to a powered device (not shown). The PD controller 116 is configured to receive the first configuration channel signal CC1 or the second configuration channel signal CC2 when a first powered device is coupled to the socket 115a. When the first powered device is plugged in to the first socket 115a, the orientation of the plug determines whether the first configuration channel signal CC1 or the second configuration channel signal CC2 is received by the PD controller 116. Furthermore, in the embodiment shown, the PD controller 116 is configured to receive the first configuration channel signal CC1 or the second configuration channel signal CC2 when a second powered device (not shown) is coupled to the second socket 115b. When the second powered device is plugged in to the second socket 115b, the orientation of the plug determines whether the first configuration channel signal CC1 or the second configuration channel signal CC2 is received by the PD controller 116.

The truth table 105 in FIG. 1A illustrates one embodiment of the total output power delivered from the charging device to the first socket 115a and the second socket 115b when the microcontroller detects if a powered device is connected to either one of the sockets or both of the sockets.

In one embodiment, when the first socket 115a is coupled to a powered device and the second socket 115b is not coupled to a powered device, the total output power delivered from the first power converter 113 and the second power converter 115 to the first socket 115a is the combination of the first output power $U_{O1}$ 125 and the second output power $U_{O2}$ 129. In an embodiment, in order to provide the sum of the first output power $U_{O1}$ 125 and the second output power $U_{O2}$ 129, the PD controller 116 provides an enable signal 133 to the bidirectional switch 117 to turn on the bidirectional switch 117. The output from the second socket 115b is denoted by X, which represents no power is delivered from the second power converter 115 to the second socket 115b since the second output power $U_{O2}$ 129 is delivered to the first socket 115a through bidirectional switch 117.

In one embodiment, when the first socket 115a is not coupled to a powered device and the second socket 115b is coupled to a powered device, the total output power delivered from the first power converter 113 and second power converter 115 to the second socket 115b is the combination of the first output power $U_{O1}$ 125 and the second output power $U_{O2}$ 129. In an embodiment, in order to provide the sum of the first output power $U_{O1}$ 125 and the second output power $U_{O2}$ 129, the PD controller 116 provides an enable signal 133 to the bidirectional switch 117 to turn on the bidirectional switch 117. The output from the first socket 115a is denoted by X, which represents no power is delivered from the first power converter 113 to the first socket 115a, since the first output power $U_{O1}$ 125 is delivered to the second socket 115b through bidirectional switch 117.

In one embodiment, when the first socket 115a is coupled to a first powered device and the second socket 115b is coupled to a second powered device, the PD controller 116 provides an enable signal 133 to the bidirectional switch 117 to turn off the bidirectional switch 117. The total output power delivered to the first socket 115a is the first output power $U_{O1}$ 122 and the total power delivered to the second socket is the second output power $U_{O2}$ 129.

Figure 1B:
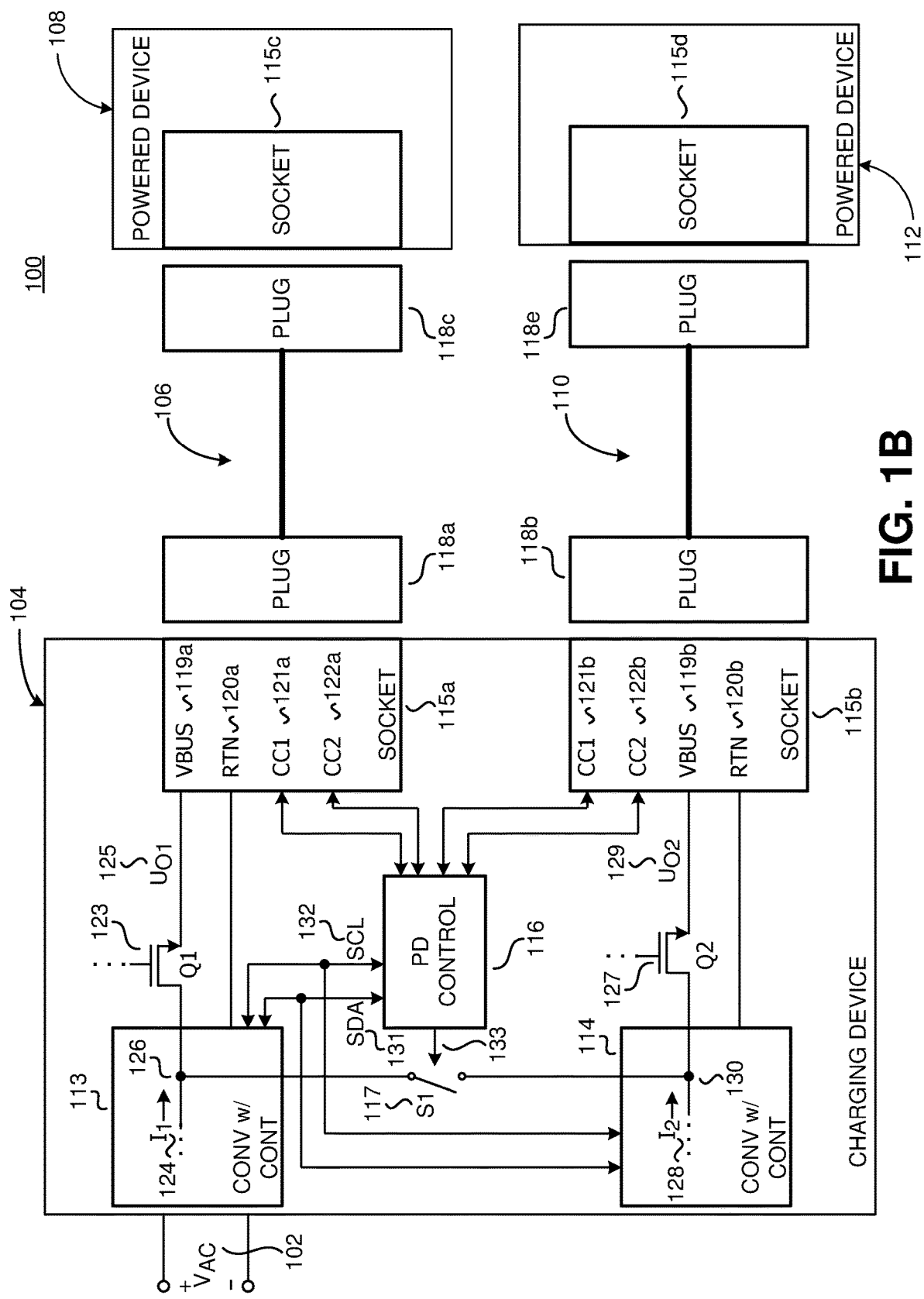
FIG. 1B illustrates an example of a multiple output charging device as shown in FIG. 1A providing power to one or more powered devices, in accordance with embodiments of the present disclosure.

FIG. 1B illustrates an example of a multiple output charging device as shown in FIG. 1A providing power to one or more powered devices, in accordance with embodiments of the present disclosure. It is appreciated that the signals illustrated in FIG. 1B may be examples of corresponding signals illustrated or described above in FIG. 1A, and that similarly named and numbered signals referenced below are coupled and function similar to as described above.

As shown in FIG. 1B, the charging system 100 includes a charging device 104 which may be configured to charge the first powered device 108 and a second powered device 112. The charging device 104 comprises a first socket 115a and a second socket 115b. The first powered device 108 comprises a socket 115c, and the second powered device 112 comprises a socket 115d. The first socket 115a of the charging device 104 may be coupled to the socket 115c of the powered device 108 through a cable 106. The second socket 115b of the charging device 104 may be coupled to the socket 115d of the powered device 112 through a cable 110. The cable 106 comprises plugs 118a and 118c, and the cable 110 comprises plugs 118b and 118e.

In one example, the charging device 104 comprises a first power converter 113, a second power converter 114, a PD controller 116, a bidirectional switch 117, a first pass transistor Q1 123, and a second pass transistor Q2 127. The first power converter 113 may be configured to generate a first output current $I_1$ 124, and is regulated by a first power converter controller. The first power converter 113 may be coupled to the first pass transistor Q1 123. As shown in one embodiment, the output of the first power converter 113 is coupled to the first pass transistor Q1 123. The second power converter 114 may be configured to generate a second output current $I_2$ 128, and is regulated by a second power converter controller. The second power converter 114 may be coupled to the second pass transistor 127. As shown in one embodiment, the output of the first power converter 113 is coupled to the first pass transistor Q1 123.

In one embodiment, the PD controller 116 may be configured to detect a coupling of the first socket 115a to the first powered device 108 and/or detect a coupling of the second socket 115b to the second powered device 112. When the first powered device 108 and/or the second powered device 112 are coupled to the charging device 104, the PD controller may negotiate a Power Delivery (PD) contract with the first powered device 108 and/or the second powered device 112. In an embodiment, the PD controller 116 is configured to detect a coupling of the first socket 115a to the first powered device 108 based on the configuration channel signal CC1 121a or CC2 122a and detect an absence of coupling of the second socket 115b to the second powered device 112 based on the configuration channel signals CC1 121b and CC2 122b. The PD controller 116 and the first powered device 108 negotiate a total output power of the charging device delivered from socket 115a to the first powered device. The PD controller 116 is configured to adjust the output of first power converter 113 and the output of the second power converter 114. In one embodiment, the first power converter controller of the first power converter 113 is configured to receive one or more communication signals from the PD controller 116. Similarly, the second power controller of the second power converter is configured to receive communication signals from the PD controller 116. In response to the communication signals from the PD controller 116, the first power converter 113 and the second power converter 114 may adjust their respective outputs.

In one embodiment, the PD controller 116 may be configured to communicate the communication signals to the first power converter controller and the second power converter controller over an inter-integrated (I²C) circuit bus as shown by the serial data signal (SDA) 131 and the serial clock signal (SCL) 132. The I2C serial communication may be configured to provide a master-slave relationship between the PD controller 116 (master) to the first power converter 113 (slave) and the second power converter 114 (slave) for regulating the output of the power converters. In one embodiment, the PD controller 116 may send one or more communication signals through the I²C circuit bus to adjust the regulation of a first output voltage, the first output current $I_1$ 124, the first output power $U_{O1}$ 125, a second output voltage, the second output current $I_2$ 128, and/or the second output power $U_{O2}$ 129. In addition, the PD controller 116 may communicate to the first power converter controller to enable or disable pass transistor Q1 123 and communicate to the second power controller to enable or disable pass transistor Q2 127 in one embodiment. Furthermore, the PD controller 116 may determine if the first output power and second output power are equal with hysteresis by reading the output parameters from the first power converter 113 and the second output power converter 114. In one embodiment, PD controller 116 may set a hysteresis range of when to communicate to the first power converter controller and the second power converter controller to change one or more of the output parameters of the first or second power converter 113, 114 when the output parameters are outside of the hysteresis range until the first output power and the second output power are equal within the hysteresis range.

In one embodiment, when the first socket 115a is coupled to the powered device 108 and the second socket 115b is not coupled to the powered device 112, the total output power delivered from the first power converter 113 and the second power converter 115 to the first socket 115a includes a combination of the first output current $I_1$ 124 and the second output current $I_2$ 128. The PD controller 116 generates an enable signal 133 to turn on the bidirectional switch 117. As such, node 126 of the first power converter 113 and node 130 of the second power converter 114 are coupled together and the output current provided by the first power converter 113 is the sum of the first output current $I_1$ 124 and the second output current $I_2$ 128. The PD controller 116 is further configured to turn off second pass transistor Q2 127, and turn on first pass transistor Q1 123. Therefore, the first output power $U_{O1}$ 125, which includes a combination of the first and second output currents $I_1$ 124, $I_2$ 128, is delivered from the charging device 104 to the socket 115a then to the powered device 108 via cable 106.

In another embodiment, the PD controller 116 is configured to detect an absence of coupling of the first socket 115a to the first powered device 108 based on the configuration channel signal CC1 121a or CC2 122a and detect a coupling of the second socket 115b to the second powered device 112 based on the configuration channel signals CC1 121b and CC2 122b. The total output power delivered from the first power converter 113 and second power converter 114 to the second socket 115b can include a combination of the first output current $I_1$ 124 and the second output current $I_2$ 128. The PD controller 116 may generate an enable signal 133 to turn on the bidirectional switch 117. As such, node 126 and node 130 are coupled together an the output current provided by the second power converter 114 is the sum of the first output current $I_1$ 124 and the second output current $I_2$. The PD controller 116 is configured to turn off the first pass transistor Q1 123, and turn on the second pass transistor Q2 123. Therefore, the second output power $U_{O2}$ 129, which includes a combination of the first and second output currents $I_1$ 124, $I_2$ 128, is delivered from the charging device 104 to the socket 115b then to the powered device 112 via cable 110.

In a further embodiment, the PD controller 116 is configured to detect both a coupling of the first socket 115a to the first powered device 108 based on the configuration channel signal CC1 121a or CC2 122a and a coupling of the second socket 115b to the second powered device 112 based on the configuration channel signals CC1 121b and CC2 122b. The PD controller 116 provides an enable signal 133 to the bidirectional switch 117 to turn off the bidirectional switch 117. As such, nodes 126 and 130 are not coupled together and the first output current $I_1$ 126 and the second output current $I_2$ 128 are not combined. The PD controller 116 is configured to turn on the first pass transistor Q1 123, and turn on the second pass transistor Q2 123. In one embodiment, the total output power delivered to the first socket 115a is the first output power $U_{O1}$ 122, which includes the first output current $I_1$ 124 and not the second output current $I_2$ 128, and the total power delivered to the second socket is the second output power $U_{O2}$ 129, which includes the second output current $I_2$ 128 and not the first output current $I_1$ 124.

Figure 1C:
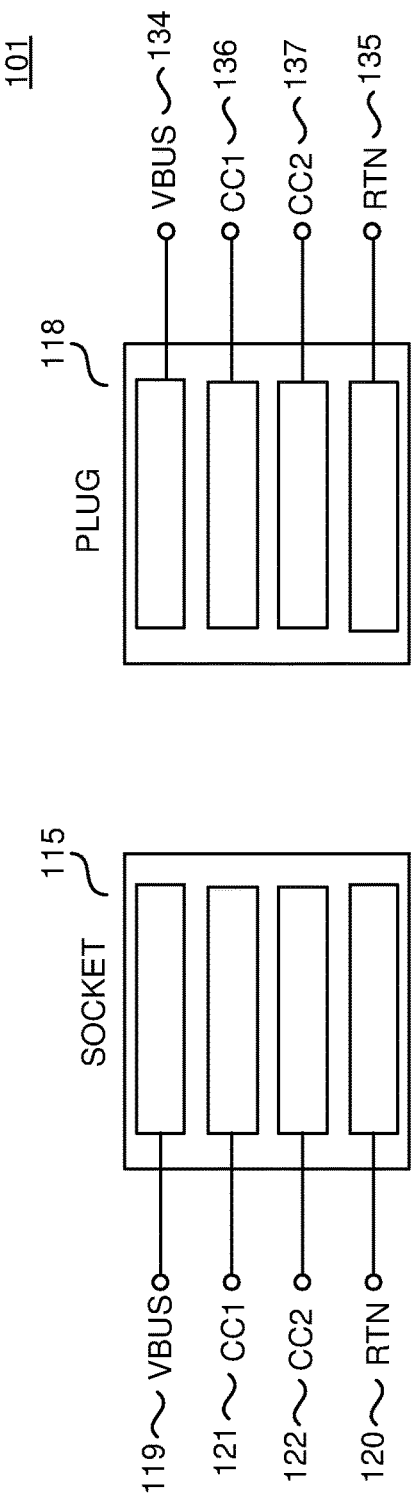
FIG. 1C is a simplified pinout diagram illustrating interconnections of a socket and a plug utilized in the charging device of FIGS. 1A and 1B.

FIG. 1C illustrates an example simplified pinout diagram 101 for the interconnections of the socket 115 and plug 118. It should be appreciated that the socket 115 and plug 118 shown in FIG. 1B is one example of sockets 115a, 115b, 115c, and 115d and plugs 118a, 118b, 118c, and 118d shown in FIGS. 1A and 1B. The example pinout diagram 101 illustrates a select few terminals for a USB Type-C socket and plug. The USB socket is discussed for the purpose of explanation, however other types of sockets and plugs may also be utilized with the teachings of the present disclosure. As shown in the depicted example, socket 115 includes a bus terminal VBUS 119, configuration channel terminal CC1 121, configuration channel terminal CC2 122, and return terminal RTN 120. Plug 118 includes bus terminal VBUS 134, configuration channel terminal CC1 136, configuration channel terminal CC2 137, and return RTN 135, which corresponds to similarly named terminals included in socket 115. In operation, plug 118 connects to socket 122 at the corresponding terminals. For the example shown, the bus terminal VBUS 134 and return terminal RTN 135 of the plug 118 can couple to the bus terminal VBUS 119 and return terminal RTN 120 of the socket 115, respectively. Further, both the configuration channel terminals CC1 136 and CC2 137 of plug 118 can couple to either of the configuration channel terminals CC1 121 and CC2 122 of socket 115. Further, the terminals of plug 118 correspond to the related terminals in the plugs attached to the same cable. For the example cable 106 shown with respect to FIG. 1B, the terminals of plug 118a correspond to the terminals in plug 118c through cable 106. Terminals in socket 115a correspond to terminals in plug 118a while terminals in plug 118c correspond to terminals in socket 115c. Thus, power may be transferred through the cable 106 between the charging device 104 and the powered device 108. It should be appreciated that the same can be said when cable 110 couples the powered device 112 to the charging device 104. Both powered devices 108 and 112 can communicate to the charging device via their respective configuration channel terminals CC1 and CC2. Further as discussed above, when only one of the powered devices 108 and 112 are coupled to the charging device 104, the outputs of power converters 113 and 114 are coupled together to enable current sharing to either powered device 108 or 112.

Figure 1D:
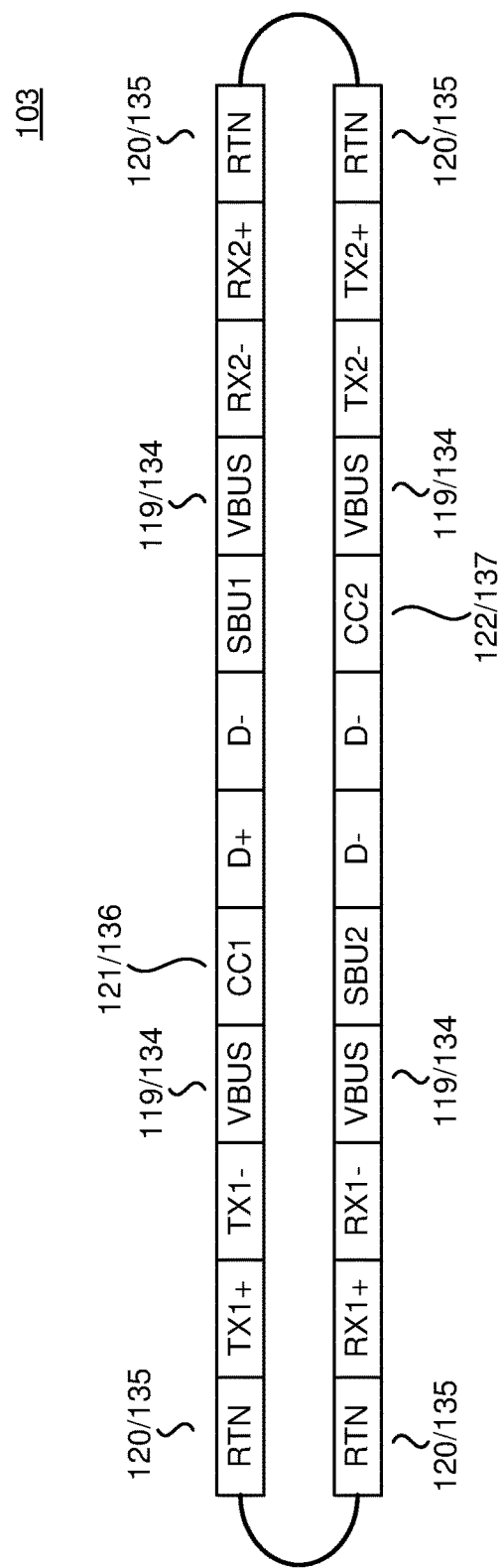
FIG. 1D is a pinout diagram of a USB type-C socket and plug utilized in the example charging device of FIGS. 1A and 1B.

FIG. 1D is a pinout diagram 103 of a USB Type-C socket and plug utilized in the example charging device 104. The pinout diagram 103 also illustrates the bus terminals VBUS 119/134, configuration channel terminals CC1 121/136, configuration channel terminals CC2 122/137, and return terminals 120/135. Further illustrated are transmission terminals TX1+/TX1−/TX2+/TX2−, receive terminals RX1+/RX1−/TX2+/TX2−, and data terminals D+/D−. Pinout diagram 103 illustrates the pin locations for the corresponding terminals and a terminal can have multiple pin locations. For example, both the return terminal RTN 120/135 and the bus terminals VBUS 119/134 have four pin locations while configuration channel terminals CC1 121/136 and CC2 122/137 have on pin location, respectively. As shown, the pin locations are on both sides of the socket and plug to allow the plug to be a reversible connector. Further, the USB Type-C socket supports USB 2.0, USB 3.0, USB 3.1, and USB 4.0 standards, along with protocols for DisplayPort and HDMI. In addition, the USB Type-C socket and plug can be utilized to allow the charging device to negotiate the appropriate level of power flow to the powered device.

Figure 2A:
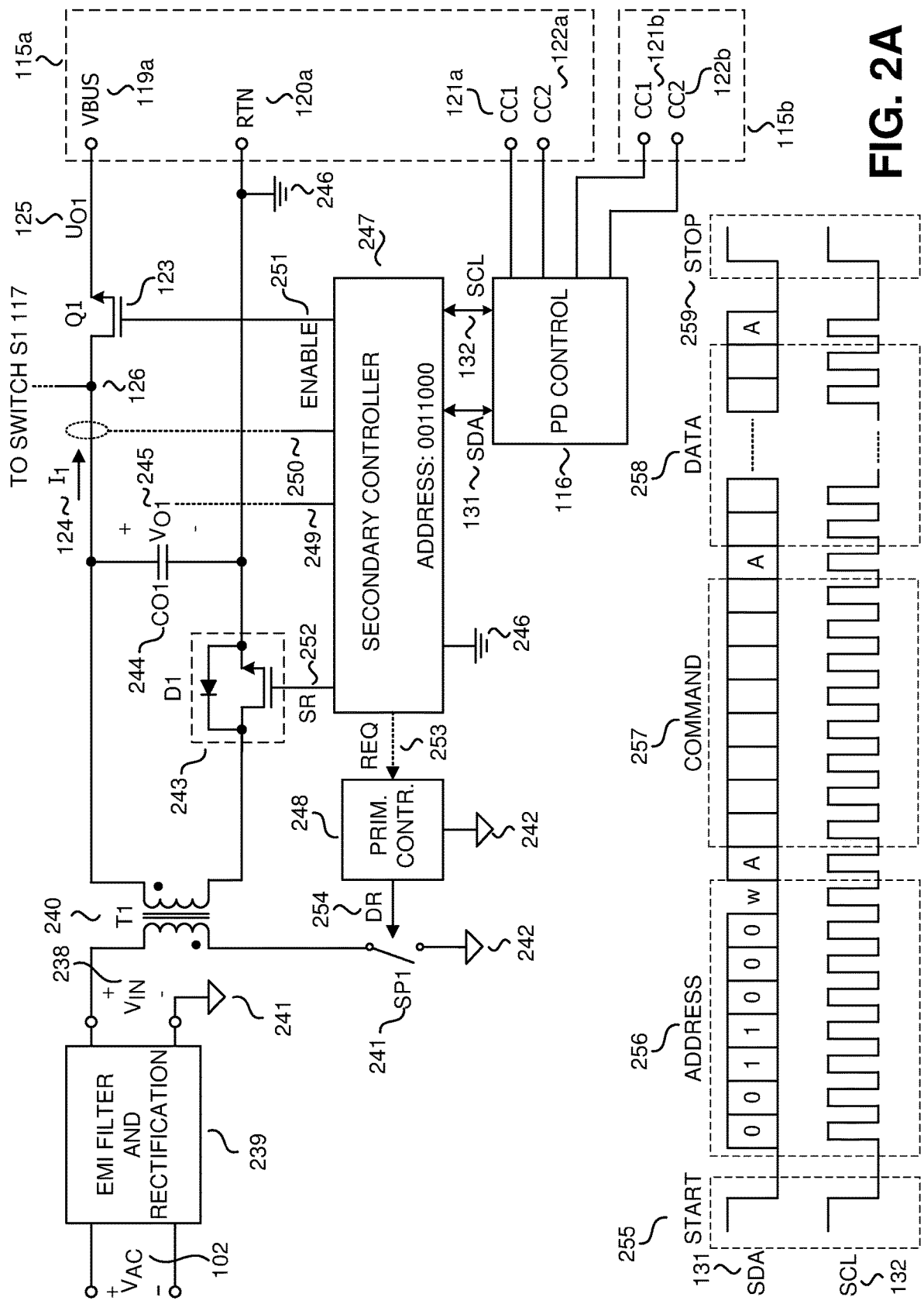
FIG. 2A is a functional block diagram of the first power converter and PD controller of the charging device of FIGS. 1A and 1B, in accordance with embodiments of the present disclosure.

FIG. 2A is a schematic illustrating an example of the first power converter 113 along with a primary controller 248, a secondary controller 247, the PD controller 116, socket 115a and socket 115b, in accordance with the teachings of the present disclosure. It should be appreciated that similarly named and numbered elements couple and function as described above. In one embodiment, the power converter controllers mentioned in the previous figures may comprise of the primary controller 248 and the secondary controller 247. In an embodiment, the PD controller 116 negotiates with the secondary controller 247 to adjust/regulate the output quantity $U_{O1}$ 125 of the first power converter 113. The output quantity $U_{O1}$ 125 may be an output voltage $V_{O1}$ 245, output current $I_1$ 124, or output power of the first power converter 113. The output quantity $U_{O1}$ 125 is provided to the bus terminal VBUS 119a of socket 115a.

For the embodiment shown, the first power converter 113 includes EMI filter and rectification 239 which receives an ac input $V_{AC}$ 102 and provides the input voltage $V_{IN}$ 238. The first power converter 113 provides output power to the socket 115a from the unregulated input voltage $V_{IN}$ 238. In other embodiments, the input voltage $V_{IN}$ 238 may be a rectified ac line voltage, a rectified and filtered ac line voltage, or a dc voltage. As shown, the input voltage $V_{IN}$ 238 is coupled to an energy transfer element T1 240. The energy transfer element T1 240 may be a coupled inductor, transformer, or an inductor. The example energy transfer element T1 240 includes two windings, a primary winding and a secondary winding. Although the example shown in FIG. 2A illustrates an energy transfer element T1 240 with two windings, it should be appreciated that the energy transfer element T1 240 may have more than two windings. Coupled to the primary winding of the energy transfer element T1 240 is a primary power switch SP1 241, which is further coupled to input return 242. As will be discussed, the primary power switch SP1 241 may be turned on and off to control the transfer of energy from the input to the output of the first power converter 113.

The secondary winding is coupled to the output rectifier D1 243, which in the depicted embodiment is a transistor used as a synchronous rectifier. However, in another embodiment, the output rectifier D1 243 may be a diode. The illustrated output rectifier D1 243 is a low-side coupled output rectifier D1 243, however the output rectifier D1 243 may also be high-side coupled. Output capacitor CO1 244 is coupled to the output rectifier D1 243 and output return 246. The output of the power converter 113 is an output quantity $U_{O1}$ 125, which may be the output voltage $V_{O1}$ 245 across the output capacitor CO1 244, output current $I_1$ 124, or a combination of the two (such as output power).

The first power converter 113 includes a secondary controller 247 and a primary controller 248 which control the switching of the output rectifier D1 243 and the primary power switch SP1 241 to regulate the output quantity $U_{O1}$ 125. In the illustrated embodiment, the first power converter 113 is shown as having a flyback topology. It should be appreciated that other known topologies and configurations of power converters may also benefit from the teachings of the present disclosure. In the depicted embodiment, the input of the first power converter 113 is galvanically isolated from the output of the first power converter 113 such that input return 242 is galvanically isolated from output return 246. Since the input and output of power converter 113 are galvanically isolated, there is no direct current (dc) path across the isolation barrier of energy transfer element T1 240, or between primary winding and secondary winding, or between input return 242 and output return 246. Further, the primary controller 248 is shown as referenced to the input return 242 while the secondary controller 247 is referenced to output return 246. As such, the primary controller 248 is galvanically isolated from the secondary controller 247. However, it should be appreciated that non-isolated converter topologies may benefit from the teachings of the present disclosure. Further, embodiments of the present disclosure could be utilized with two controllers which are not isolated from each other. For example, a half-bridge power converter generally has a high side controller separated from a low side controller.

In the embodiment shown, the first power converter 113 further includes the secondary controller 247 configured to receive a voltage sense signal 249 representative of the output voltage $V_{O1}$ 245 and a current sense signal 250 representative of the output current $I_1$ 240. The secondary controller 247 is configured to generate a secondary drive signal SR 252 to control switching of the synchronous rectifier D1 243 which is coupled to the output of the power converter 113. The secondary drive signal SR 252 may be a rectangular pulse waveform with varying lengths of logic high and logic low sections. Logic high sections may correspond with turning on the synchronous rectifier D1 252 while logic low sections may correspond with turning off the synchronous rectifier D1 252.

The secondary controller 247 is also configured to generate a request signal REQ 253 in response to a sensed output quantity $U_{O1}$ 125, which may be provided by the voltage sense signal 249, the current sense signal 250, or a combination of the two. In other words, the secondary controller 247 is coupled to generate the request signal REQ 253 in response to the sensed output voltage $V_{O1}$ 245, sensed output current $I_1$ 124, and/or sensed output power. The request signal REQ 253 may include request events which indicate that the primary controller 248 should turn ON the primary power switch SP1 241. The request signal REQ 253 may be a rectangular pulse waveform which pulses to a logic high value and quickly returns to a logic low value. The logic high pulses may be referred to as request events. The frequency of the request events may be responsive to the sensed output voltage $V_{O1}$ 245, sensed output current $I_1$ 240, or sensed output power.

The primary controller 248 is configured to receive the request signal REQ 253 through a communication link. In the embodiment illustrated, communication link is shown in dashed lines to indicate that the communication link provides galvanic isolation between the primary controller 248 and the secondary controller 247. The galvanic isolation may be provided by using an inductive coupling, such as a transformer or coupled inductor, an optocoupler, a capacitive coupling, or other device that maintains galvanic isolation. The primary controller generates the primary drive signal DR 254 to control the turning on and off of the primary power switch SP1 241 in response to the request signal REQ 253. Further, the primary controller generates the primary drive signal DR 254 to turn on the primary power switch SP1 241 in response to request events of the request signal REQ 253.

To regulate the output quantity $U_{O1}$ 125 provided to the socket 115a, the primary controller 248 and secondary controller 247 vary one or more switching parameters of the primary power switch SP1 241. Example parameters may include the on-time, off-time, and the switching frequency/period of the primary power switch SP1 241. In one example, the secondary controller 247 may determine the switching frequency/period of the primary power switch SP1 241 via the request signal REQ 253 while the primary controller 248 determines the on-time of the primary power switch SP1 241. In one example, the switching frequency of the primary power switch SP1 241 is substantially the frequency of request events of the request signal REQ 253. In another example, the on-time may be determined by when the current through the primary power switch SP1 241 reaches a current limit. In a further example, the on-time may be determined by the frequency of the request events of the request signal REQ 253. The secondary controller 247 may increase the switching frequency of power switch SP1 241 to deliver more energy to bus terminal VBUS 119a. However, it should be appreciated that other control schemes may be utilized.

It is generally understood that a switch that is closed may conduct current and is considered on, while a switch that is open cannot conduct current and is considered off. In one example, the primary power switch SP1 241 may be a transistor such as a metal-oxide-semiconductor field-effect transistor (MOSFET), bipolar junction transistor (BJT), silicon carbide (SiC) based transistor, gallium nitride (GaN) based transistor, or an insulated-gate bipolar transistor (IGBT). In one embodiment, primary controller 248 and secondary controller 247 may be formed as part of an integrated circuit that is manufactured as either a hybrid or monolithic integrated circuit, or may be implemented with discrete electrical components or a combination of discrete and integrated components. In one embodiment, the primary power switch SP1 241 may also be integrated in a single integrated circuit package with the primary controller 248 and secondary controller 247. In addition, in one embodiment, primary controller 248 and secondary controller 247 may be formed as separate integrated circuits. The primary power switch SP1 241 may also be integrated in the same integrated circuit as the primary controller 248 could be formed on its own integrated circuit. Further, it should be appreciated that both the primary controller 248, secondary controller 247, and primary power switch SP1 241 need not be included in a single package and may be implemented in separate integrated circuit packages or a combination of combined/separate packages. The communication link may be formed from a lead frame which supports the integrated circuit(s) of the primary and secondary controllers 248, 247.

A first pass transistor Q1 123 is coupled between the output of the first power converter 113 and the bus terminal VBUS 119a of socket 115a. Node 126 is coupled between the output capacitor CO1 and the pass transistor Q1 123. As shown in FIGS. 1A and 1B, the bidirectional switch S1 117 controlled by the PD controller 116 to enable output current sharing couples to node 126 of the first power converter 113. The first pass transistor Q1 123 is enabled or disabled to either allow the socket 115a (via bus terminal VBUS 119a) to receive the output current $I_1$ 124, output voltage $V_{O1}$ 245, and output power. In the embodiment shown, the secondary controller 247 outputs an enable signal 251 to turn on or off the pass transistor Q1 123. However, it should be appreciated that the PD controller 116 may couple to the pass transistor Q1 123 and output the enable signal 251 to turn on or off the pass transistor Q1 123.

PD controller 116 is shown as coupled to configuration channel terminals CC1 121a and CC2 122a of socket 115a and configuration channel terminals CC1 121b and CC2 122b of socket 115b. For this example, bus terminal VBUS and return terminal RTN of socket 115b are not illustrated so as not to obscure embodiments of the present disclosure. PD controller 116 outputs one or more communication signals to the secondary controller 247. As shown in FIG. 2A, the example communication signals include a serial data signal SDA 131 and clock signal SCL 132 of the I²C two-wire interface protocol. However, it should be appreciated that other communication protocols could be used.

The secondary controller 247 may include a digital register in which information about the power converter 113 is stored, such as the present value of the output voltage $V_{O1}$ 245, output current $I_1$ 124, and output power. The secondary controller 247 also stores information such as the desired regulation values for the output voltage $V_{O1}$ 245, output current $I_1$ 124, and output power. The commands by the PD controller 116 can generally be categorized as "read" commands and "write" commands. "Read" commands may include a status inquiry by the PD controller 116 in which the PD controller 116 requests the current value of the output voltage $V_{O1}$ 245, output current $I_1$ 124, or output power. "Write" commands may include a regulation or adjust command in which the PD controller 116 adjusts the desired regulation values for the output voltage $V_{O1}$ 245, output current $I_1$ 124, or output power. "Write" commands may also include an enable or disable command of the pass transistor Q1 123.

The bottom of FIG. 2A illustrates the general sequence of the I²C communication protocol, illustrating the serial data signal SDA 131 and the clock signal SCL 132. For a single communication, there is generally a start window 255 to begin communication from a master to a slave, an address window 256 to indicate which slave (secondary controller 247) is the intended recipient of the communication, a command window 257 to determine if the PD controller 116 is reading or writing to the appropriate slave (secondary controller 247), one or more data windows and a stop window to indicate the communication has ended. For a read command, the data window 258 may include the registry address of the slave (secondary controller 247) to be read.

For a write command, the data window 258 may include the registry address of the slave (secondary controller 247) to be written along with the data to be written into that registry address.

For the start window 255, both the serial data signal SDA 131 and the serial clock SCL 132 are pulled logic low. After the start window 255, the clock signal SCL 132 is a rectangular pulse waveform of logic high and logic low sections with a fixed frequency and period. The clock signal SCL 132 substantially toggles between the start window 255 and the stop winding 259. During the address window 256, command window 257, and data window(s) 258, each period of the clock signal SCL 132 corresponds to one bit of the serial data signal SDA 131. During the address window 256, the serial data signal SDA 131 may toggle between logic high and logic low values to indicate the address of the secondary controller 247. For the embodiment shown, the address of the secondary controller 247 is the 7-bit word: 0011000. After each window, the secondary controller 247 sends an "acknowledgement A" to the PD controller 116 via the serial data signal SDA 131. The command window 257 could be an 8-bit word representative of the command which the PD controller 116 sends to the secondary controller 247. One more data windows 258 could be digital words of various length, depending on the design of the secondary controller 247. As shown, for the stop window 259, both the serial data signal SDA 131 and the clock signal SCL 132 are pulled logic high to indicate the communication has ended. When no communications are being sent, both the serial data signal SDA 131 and the clock signal SCL 132 are logic high.

In operation, the PD controller 116 monitors the voltages of configuration channel terminals CC1 121a and CC2 122a of socket 115a and configuration channel terminals CC1 121b and CC2 122b of socket 115b to determine if the powered device 108 is plugged into socket 115a and/or powered device 112 is plugged into socket 115b. PD controller 116 negotiates with the coupled powered device for an appropriate level of power delivery through the appropriate configuration channel terminals CC1 121a and CC2 122a of socket 115a or configuration channel terminals CC1 121b and CC2 122b of socket 115b. For the example of the first power converter 113 shown in FIG. 2A, the PD controller 116 can negotiate with a powered device for the desired value of output voltage $V_{O1}$ 245, output current $I_1$ 124, and/or output power provided to the bus terminal VBUS 119a of socket 115a.

Figure 2B:
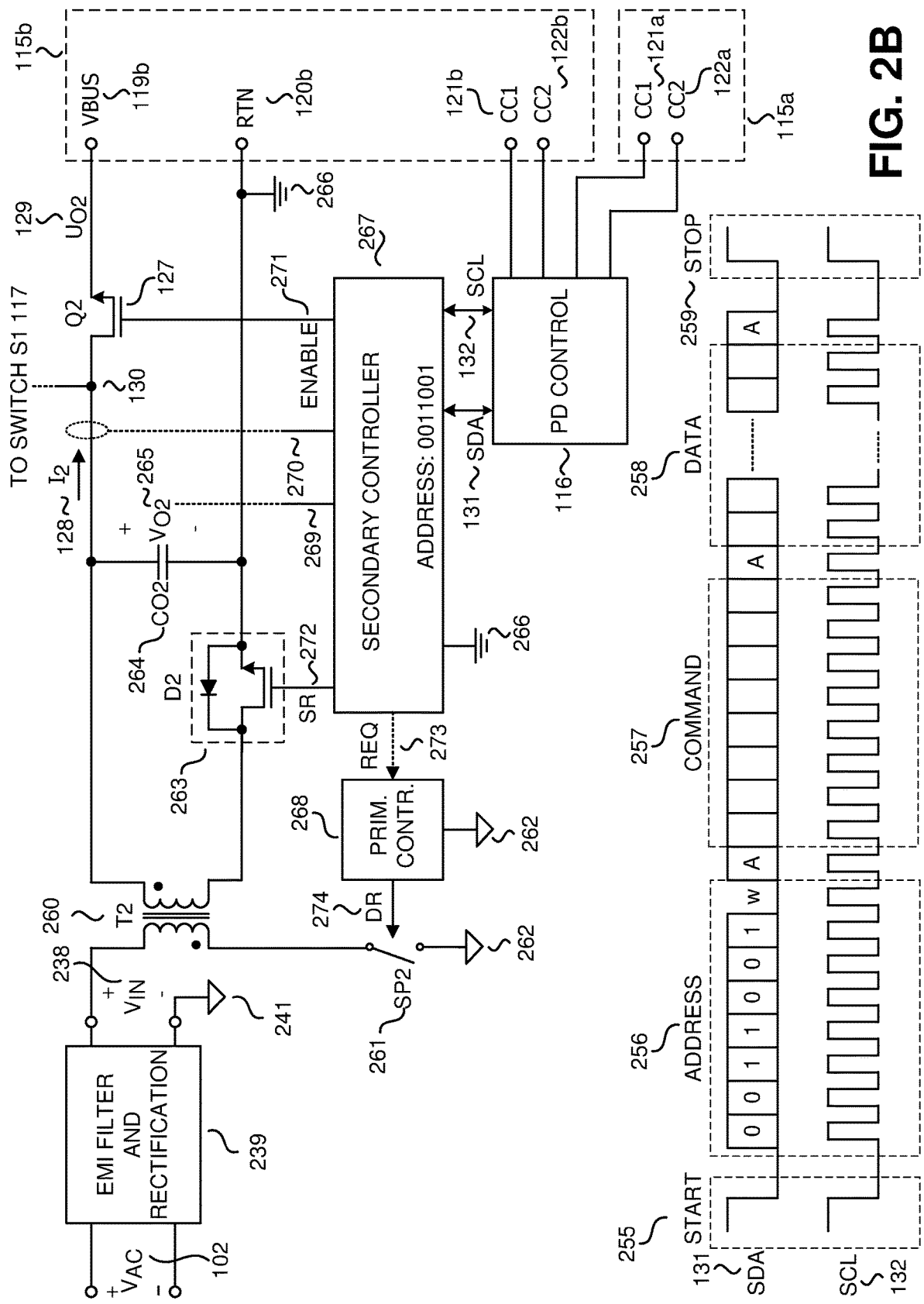
FIG. 2B is a functional block diagram of the second power converter and PD controller of the charging device of FIGS. 1A and 1B, in accordance with embodiments of the present disclosure.

In one embodiment of the disclosure, if two powered devices are coupled to the charging device, e.g. a powered device is coupled to first socket 115a and another powered device is coupled to second socket 115b, the PD controller 116 outputs the serial data signal SDA 131 and the clock SCL 132 to the secondary controller 247 to enable pass transistor Q1 123 and to enable the pass transistor Q2 127 (shown in FIGS. 1B and 2B). Further, the PD controller 116 disables the bidirectional switch S1 117, such that there is no current sharing between the first power converter 113 and the second power converter 114. The PD controller 116 may negotiate the Power Delivery contract with each powered device. The first power converter 113 provides energy to the powered device coupled via first socket 115a and the PD controller 116 outputs the serial data signal SDA 131 and the serial clock SCL 132 to adjust the regulation values of output voltage $V_{O1}$ 245, output current $I_1$ 124, and/or output power provided by the first power converter 113 per the Power Delivery contract with the powered device coupled via first socket 115a. As shown in FIG. 2B, the second power converter 114 provides energy to the powered device coupled via second socket 115b and the PD controller 116 outputs the serial data signal SDA 131 and the clock SCL 132 to adjust the regulation values of output voltage $V_{O1}$ 265, output current $I_2$ 128, and/or output power provided by the second power converter 114 per the Power Delivery contract with the powered device coupled via second socket 115b.

In one embodiment, if a single powered device is coupled to the charging device via the first socket 115a, the PD controller 116 outputs the serial data signal SDA 131 and the clock SCL 132 to the secondary controller 247 to enable pass transistor Q1 123 and to disable the pass transistor Q2 127 (shown in FIGS. 1B and 2B). Further, the PD controller 116 enables the bidirectional switch S1 117 such that the second power converter 114 can share its output current $I_2$ 128 with the first power converter 113. The PD controller 116 may negotiate the Power Delivery contract with the powered device coupled via the first socket 115a. The first power converter 113 provides energy to the powered device coupled via first socket 115a and the PD controller 116 outputs the serial data signal SDA 131 and the serial clock SCL 132 to adjust the regulation values of output voltage $V_{O1}$ 245, output current $I_1$ 124, and/or output power provided by the first power converter 113 per the power delivery contract with the powered device coupled via socket 115a. As shown in FIG. 2B, the second power converter 114 provides energy to the powered device coupled via first socket 115a and the PD controller 116 outputs the serial data signal SDA 131 and the clock SCL to adjust the regulation values of output voltage $V_{O2}$ 265, output current $I_2$ 128, and/or output power provided by the second power converter 114 per the Power Delivery contract with the powered device coupled via first socket 115a.

In one embodiment, if a single powered device is coupled to the charging device via second socket 115b, the PD controller 116 outputs the serial data signal SDA 131 and the clock SCL 132 to the secondary controller 247 to disable pass transistor Q1 123 and to enable the pass transistor Q2 127 (shown in FIGS. 1B and 2B). Further, the PD controller 116 enables the bidirectional switch S1 117 such that the first power converter 113 can share its output current $I_1$ 124 with the second power converter 114. The PD controller 116 may negotiate the Power Delivery contract with the powered device coupled via the second socket 115b. As shown in FIG. 2B, the second power converter 114 provides energy to the powered device coupled via socket 115b and the PD controller 116 outputs the serial data signal SDA 131 and the serial clock SCL 132 to adjust the regulation values of output voltage $V_{O2}$ 265, output current $I_2$ 128, and/or output power provided by the second power converter 114 per the Power Delivery contract with the powered device coupled via socket 115b. As shown in FIG. 2A, the first power converter 113 provides energy to the powered device coupled via socket 115b and the PD controller 116 outputs the serial data signal SDA 131 and the serial clock SCL 132 to adjust the regulation values of output voltage $V_{O1}$ 245, output current $I_1$ 124, and/or output power provided by the first power converter 113 per the Power Delivery contract with the powered device coupled via socket 115b.

FIG. 2B illustrates an example of the second power converter 114 along with a primary controller 268, a secondary controller 267, the PD controller 116, first socket 115a and second socket 115b, in accordance with teachings of the present disclosure. It should be appreciated that similarly named and numbered elements couple and function as described above. In one example, the PD controller 116 negotiates with the secondary controller 267 to adjust/ regulate the output quantity $U_{O2}$ 129 of the second power converter 114. The output quantity $U_{O2}$ 129 may be an output voltage $V_{O2}$ 265, output current $I_2$ 128, or output power of the second power converter 114. The output quantity $U_{O2}$ 129 may be provided to the bus terminal VBUS 119b of socket 115b.

It should be appreciated that the second power converter 114 shown in FIG. 2B shares many similarities as the first power converter 113 shown with respect to FIG. 2A and similarly named elements couple and function as described above. However, elements have been renumbered to avoid confusion. For example: energy transfer element T2 260, primary power switch SP2 261, input return 262, output rectifier D2 263, output capacitor CO2 264, output return 266, secondary controller 267, primary controller 268, voltage sense signal 269 representative of output voltage $V_{O2}$ 265 across output capacitor CO2 264, current sense signal 270 representative of output current $I_2$ 128, enable signal 271, request signal REQ 273, secondary drive signal SR 272 and primary drive signal DR 274 have been renumbered in FIG. 2B, but couple and function to similarly named elements described above. Similar to FIG. 2A, FIG. 2B illustrates node 130 coupled between the output of the second power converter 114 and the pass transistor Q2 127. As shown, node 130 is coupled between the output capacitor CO2 264 and the pass transistor Q2 127. As shown in FIGS. 1A and 1B, the bidirectional switch S1 117 controlled by the PD controller 116 to enable output current sharing couples to node 130 of second power converter 114. The pass transistor Q2 127 is enabled or disabled to either allow the socket 115b (via bus terminal VBUS 119b) to receive the output current $I_2$ 128, output voltage $V_{O2}$ 265, and output power. At least one difference, however, is the secondary controller 267 of FIG. 2B is, in this embodiment, addressed as "0011001" such that the PD controller 116 can send commands to the secondary controller 267 via serial data signal SDA 131 and serial clock signal SCL 132.

In other embodiments, the PD controller 116 can control power converter 113 and power converter 114 without a communication bus. The secondary controllers 247 and 267 can further comprise/include comparators to regulate the output current and/or the output voltage. The first comparator may be configured to compare an output current of the power converter to a current reference. The current reference may be a voltage signal which is representative of a current. The PD controller 116 can be configured to directly adjust the current reference of the first comparator in order to regulate the output current to the value determined by the PD controller 116. In addition, the second comparator may be configured to compare an output voltage of the power converter to a voltage reference. The PD controller 116 can be configured to directly adjust the voltage reference of the second comparator in order to regulate the output voltage to the value determined by the PD controller 116.

Figure 3:
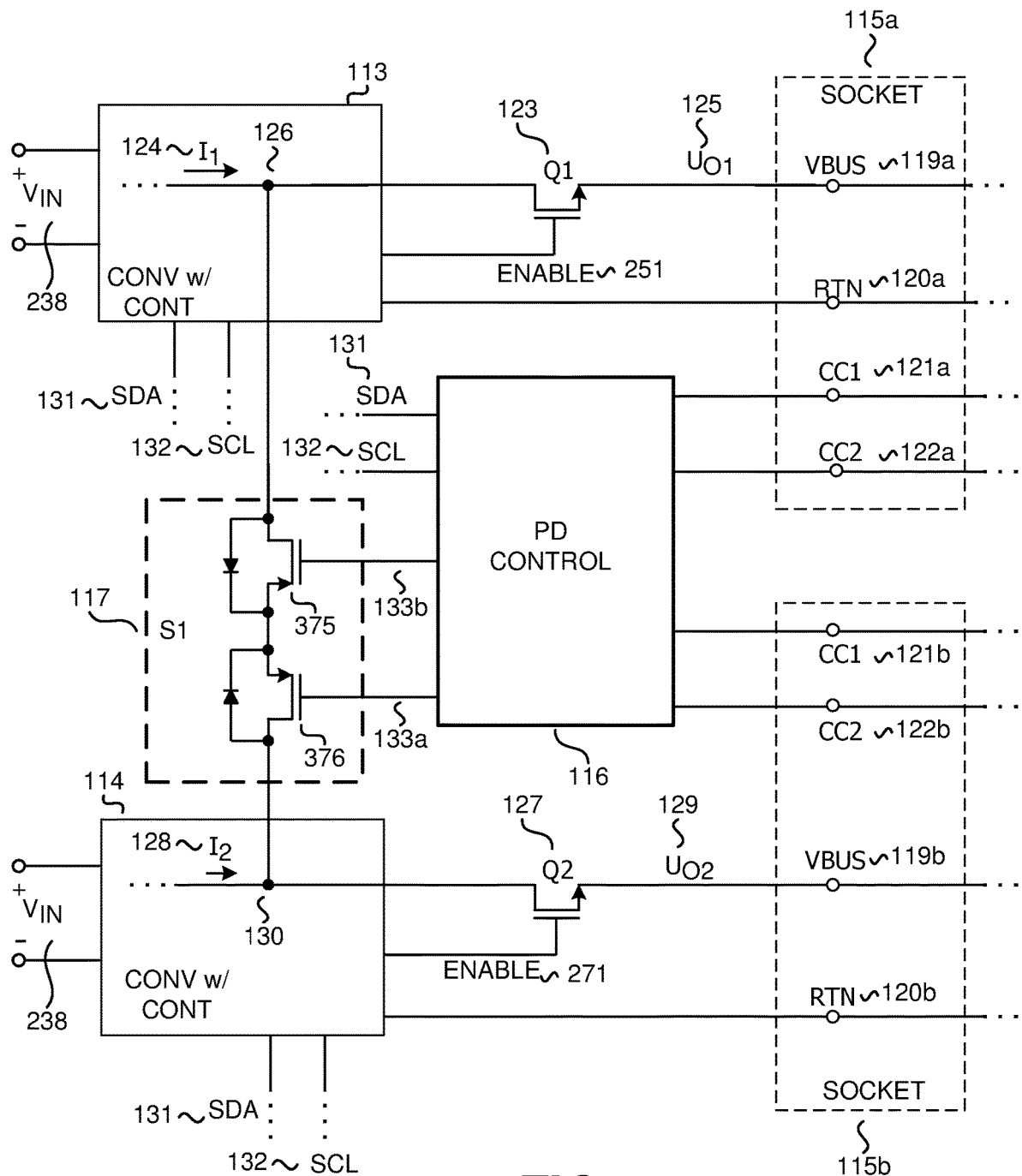
FIG. 3 illustrates an example of a multiple output charging device that can provide power to one or more powered devices by controlling a bidirectional switch of FIGS. 1A and 1B, in accordance with embodiments of the present disclosure.

FIG. 3 illustrates an example of a multiple output charging device 104 which may provide power to one or more powered devices by controlling a bidirectional switch 117, in accordance with teachings of the present disclosure. It is appreciated that the elements and signals illustrated in FIG. 3 may be examples of corresponding elements and signals illustrated or described above in FIGS. 1A, 1B, 1C, 1D, 2A, and 2B, and that similarly named and numbered elements and signals referenced below are coupled and function similar to as described above.

In one embodiment, the charging device 104 comprises a first power converter 113, a second power converter 114, a first socket 115a, a second socket 115b, a PD controller 116, a bidirectional switch 117, a first pass transistor Q1 123, and a second pass transistor Q2 127. The first power converter 113 is configured to receive an input voltage $V_{IN}$ 238, and further configured to generate a first output current $I_1$ 124, and may regulated by a first power converter controller. In the embodiment shown, the first power converter 113 is coupled to the first pass transistor Q1 123. The second power converter 114 is configured to receive the input voltage $V_{IN}$ 238, and further configured to generate a second output current $I_2$ 128, and may be regulated by a second power converter controller. In the example shown, the second power converter 114 is coupled to the second pass transistor Q2 127. In one embodiment. the bidirectional switch 117 comprises of a first transistor 375 and a second transistor 376. In one embodiment, the first and second transistors 375,376 may be p-type metal-oxide-semiconductor field effect transistors (PMOS).

The charging device 104 operates in a similar as described in the previous FIGS. For this embodiment, the operation of the bidirectional switches 117 will be described with respect to when one powered device is coupled to a single socket and when both powered devices are coupled to the both sockets.

In one embodiment, when the first socket 115a is coupled to the powered device and the second socket 115b is not coupled to the powered device, the total output power delivered from the first power converter 113 and the second power converter 114 to the first socket 115a may include a combination of the first output current $I_1$ 124 and the second output current $I_2$ 128. The PD controller 116 turns off the second pass transistor Q2 127 by communicating to the second power converter controller of the second power converter 114 through the I2C circuit bus lines SDA 131 and SCL 132. The second power converter 114 generates a logic low enable signal 271 to turn off the second pass transistor Q2 127. The PD controller 116 also generates the enable signals 133a and 133b to turn on the PMOS transistors 375 and 376. In one embodiment, a logic low value for the enable signals 133a and 133b turn on the PMOS transistors 375 and 376. As such, the second output current $I_2$ 128 flows from node 130, through PMOS transistors 376 and 375 to node 126. As such, the current provided by the first power converter 113 from node 126 may be the sum of the first output current $I_1$ 124 and the second output current $I_2$ 128. In one embodiment, the PD controller 116 is configured to turn on first pass transistor Q1 123 by communicating to the first power converter controller of the first power converter 113 through the I2C circuit bus lines SDA 131 and SCL 132. Therefore, the first output power $U_{O1}$ 125, which includes a combination of the first output current $I_1$ 124 and the second output current $I_2$ 128, is delivered from the charging device to the socket 115a through the VBUS 119a with respect to the return 120a.

In one embodiment, when the first socket 115a is not coupled to the powered device 108 and the second socket 115b is coupled to the powered device 112, the total shared output power delivered from the first power converter 113 and the second power converter 114 to the second socket 115b may be the combination of the first output current $I_1$ 124 and the second output current $I_2$ 128. The PD controller 116 is configured to turn off the first pass transistor Q1 123 by communicating to the first power converter controller of the first power converter 113 through the I2C circuit bus lines SDA 131 and SCL 132. The first power converter 113 generates a logic low value of enable signal 251 to turn off first pass transistor Q1 123. In one embodiment, the PD controller 116 generates the enable signals 133a and 133b to turn on the PMOS transistors 375 and 376. In one embodiment, a logic low value for the enable signals 133a and 133b turns on the PMOS transistors 375 and 376. As such, the first output current $I_1$ 124 flows from node 126 through PMOS transistors 375 and 376 to node 130. As such, the current provided from node 130 by the second power converter 114 may be the sum of the first output current $I_1$ 124 and the second output current $I_2$ 128. Further, the PD controller 116 may be configured to turn on the second pass transistor Q2 127 by communicating to the second power converter controller of the second power converter 114 through the I2C circuit bus lines SDA 131 and SCL 132. Therefore, the second output power $U_{O2}$ 129, which includes a combination of the first output current $I_1$ 124 and the second output current $I_2$ 128, is delivered from the charging device 104 to the second socket 115b through the VBUS 119b with respect to the return 120b.

In another embodiment, the PD controller 116 is configured to detect both a coupling of the first socket 115a to the first powered device 108 based on the configuration channel signal CC1 121a or CC2 122a and a coupling of the second socket 115b to the second powered device 112 based on the configuration channel signals CC1 121b and CC2 122b. The PD controller 116 provides a logic high value for enable signals 133a and 133b turns off the PMOS transistors 375, 376. As such, the first output current $I_1$ 126 and the second output current $I_2$ 128 are not combined. The PD controller 116 is configured to turn on first pass transistor Q1 123 by communicating to the first power converter controller of the first power converter 113 and further configured to turn on the second pass transistor Q2 127 by communication to the first power converter controller of the second power converter 114 through the I2C circuit bus lines SDA 131 and SCL 132. The first power converter 113 generates a logic high value for enable signal 251 to turn on the first pass transistor Q1 123. Therefore, the first output power $U_{O1}$ 125, which includes the first output current $I_1$ 124, may be delivered from the charging device 104 to the socket 115a through the VBUS 119a with respect to the return 120a. The second power converter 114 generates a logic high value for enable signal 271 to turn on the second pass transistor Q2 127. Therefore, the second output power $U_{O2}$ 129, which includes the second output current $I_2$ 128, may be delivered from the charging device 104 to the socket 115b through the VBUS 119b with respect to the return 120b.

Figure 4A:
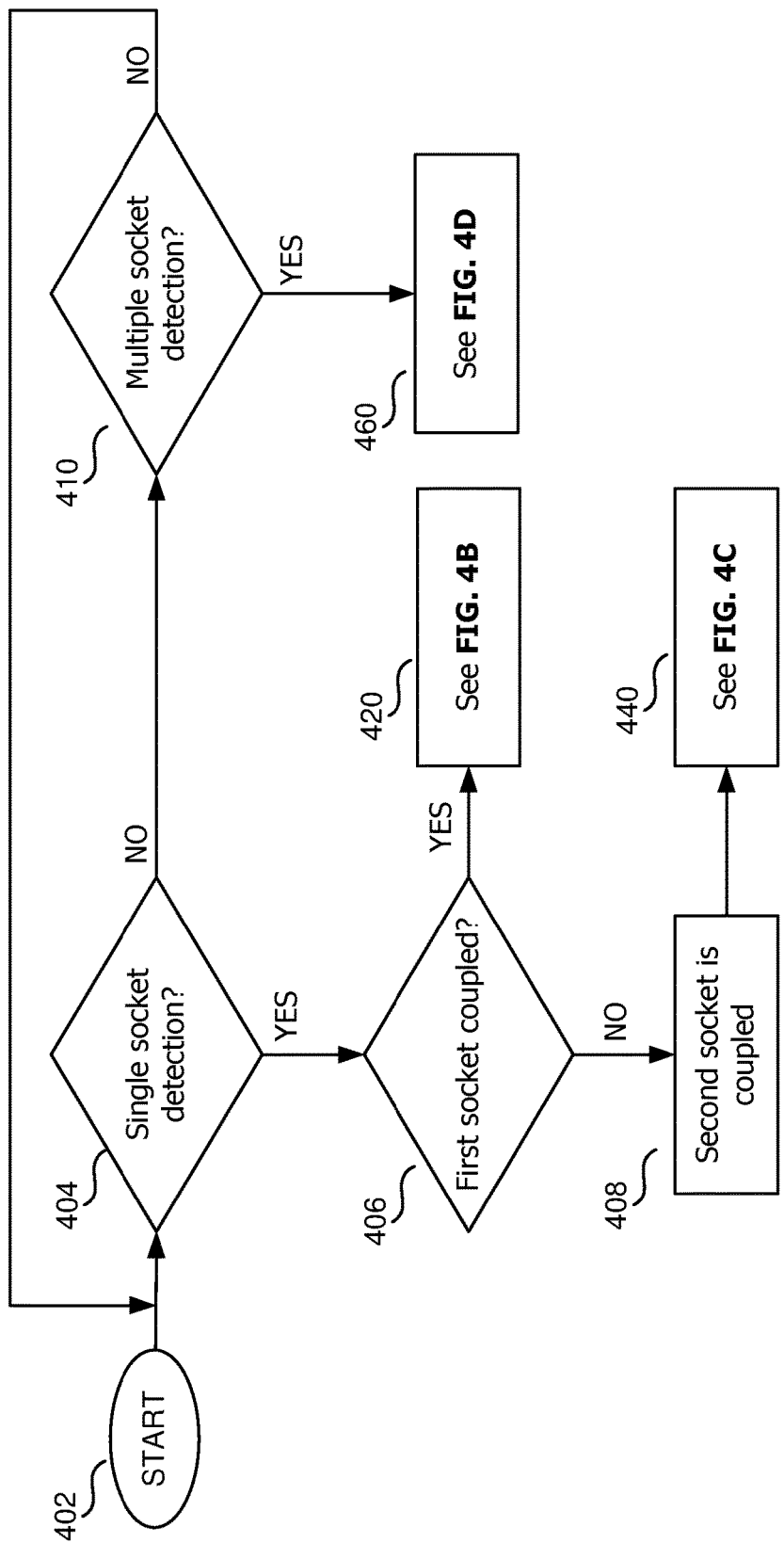
FIG. 4A illustrates an example of a flow diagram illustrating the microcontroller determining if a single socket is coupled to a powered device or multiple sockets are connected to a powered device, in accordance with embodiments of the present disclosure.

FIG. 4A is a flow diagram illustrating a process 400 for the microcontroller to determine if a single socket is coupled to a powered device or multiple sockets are connected to powered devices. In the example of FIG. 4A, the total number of sockets is two. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

Process 400 begins at start block 402 and proceeds to decision block 404. At decision block 404, the microcontroller determines if a single socket has been coupled to a powered device based on the configuration channel signals received at their respective sockets. If a single socket has been detected to couple to a powered device, process 400 proceeds to decision block 406. At decision block 406, the microcontroller determines if the first socket is coupled when the microcontroller receives configuration channel signals from the first socket. If the first socket is coupled, process 400 proceeds to block 420 which leads to FIG. 4B. The process shown in FIG. 4B further describes the current sharing that is delivered to the first socket to the powered device. If the first socket is not coupled, process 400 proceeds to block 408. At block 408, the second socket is coupled, and process 400 proceeds to block 440 which leads to FIG. 4C. The process shown in FIG. 4C further describes the current sharing that is delivered to the second socket to the powered device.

If a single socket has not been detected at decision block 404, process 400 proceeds to decision block 410. At decision block 410, the microcontroller determines if multiple sockets are coupled to powered devices based on the configuration channel signals received at multiple sockets. If no sockets are coupled to the powered devices, process 400 loops back to decision block 404. If multiple sockets are coupled to powered devices, process 400 proceeds to block 460 which leads to FIG. 4D. The process shown in FIG. 4D further describes the absence of current sharing because multiple powered devices are coupled to the socket.

Figure 4B:
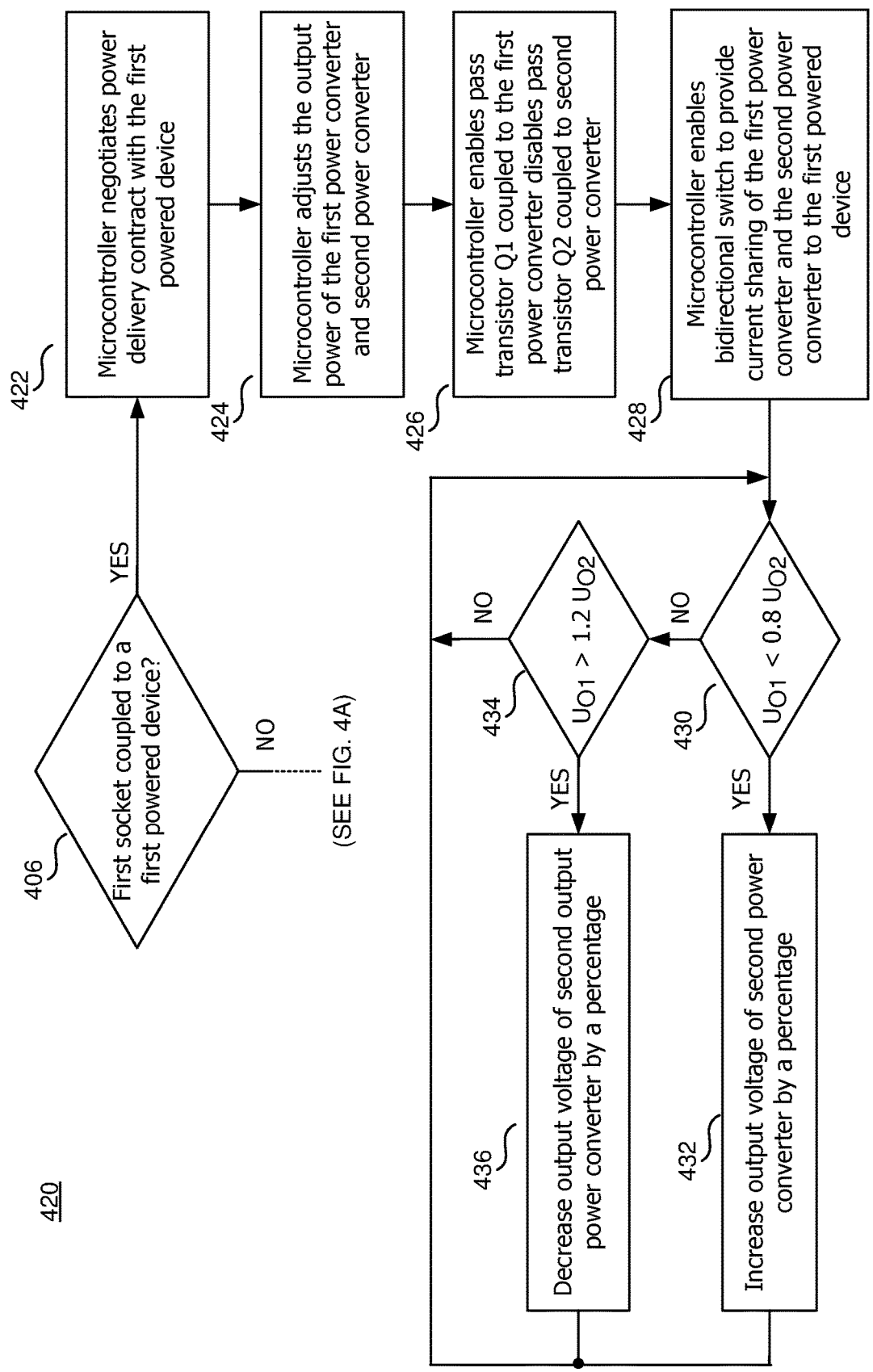
FIG. 4B illustrates an example of a flow diagram illustrating the operation of the charging device when only a first socket is coupled to a powered device, in accordance with embodiments of the present disclosure.

FIG. 4B illustrates an example of a flow diagram illustrating the operation of the charging device when only a first socket is coupled to a powered device. Block 420 is a continuation of the flow diagram as shown in FIG. 4A. For reference, decision block 406 for the microcontroller to determine if the first socket is coupled to powered device is reproduced for clarity. If the first socket is coupled to the powered device, process 400 proceeds to block 422. At block 422, the microcontroller negotiates a compatible power delivery contract with the first powered device. Process 400 proceeds to block 424. At block 424, the microcontroller adjusts the output power of the first power converter and the second output converter. As mentioned previously, the microcontroller is configured to communicate to the first power converter controller and the second power controller to change the output power. Process 400 proceeds to block 426. At block 426, the microcontroller disables the second pass transistor (Q2) coupled to the second power converter. As mentioned previously, the microcontroller is configured to communicate to the second power converter controller to generate a signal to turn off the second pass transistor. Process 400 proceeds to block 428. At block 428, the microcontroller enables the bidirectional switch to provide current sharing of the first power converter and the second power converter to the first powered device through the first socket. Process 400 proceeds to decision block 430. At decision block 430, the microcontroller compares the first output power and the second output power. If the first output power is less than eighty percent of the second output power, the microcontroller has determined these values are outside the hysteresis range. Process 400 proceeds to block 432. At block 432 the microcontroller communicates to the second power converter to increase the output voltage of the second power converter by a percentage. Process 400 loops back to decision block 430.

If the first output power is not less than eighty percent of the second output power, process 400 proceeds to decision block 434. At decision block 434, the microcontroller compares the first output power and the second output power. If the first output power is greater than one-hundred twenty percent of the second output power, the microcontroller has determined these values are outside the hysteresis range. Process 400 proceeds to block 436. At block 436 the microcontroller communicates to the second power converter to decrease the output voltage of the second power converter by a percentage. Process 400 loops back to decision block 430. At decision block 434, if the first output power is not greater than one-hundred twenty percent of the second output power, the microcontroller has determine these values are within the hysteresis range. Process 400 loops back to decision block 430.

Figure 4C:
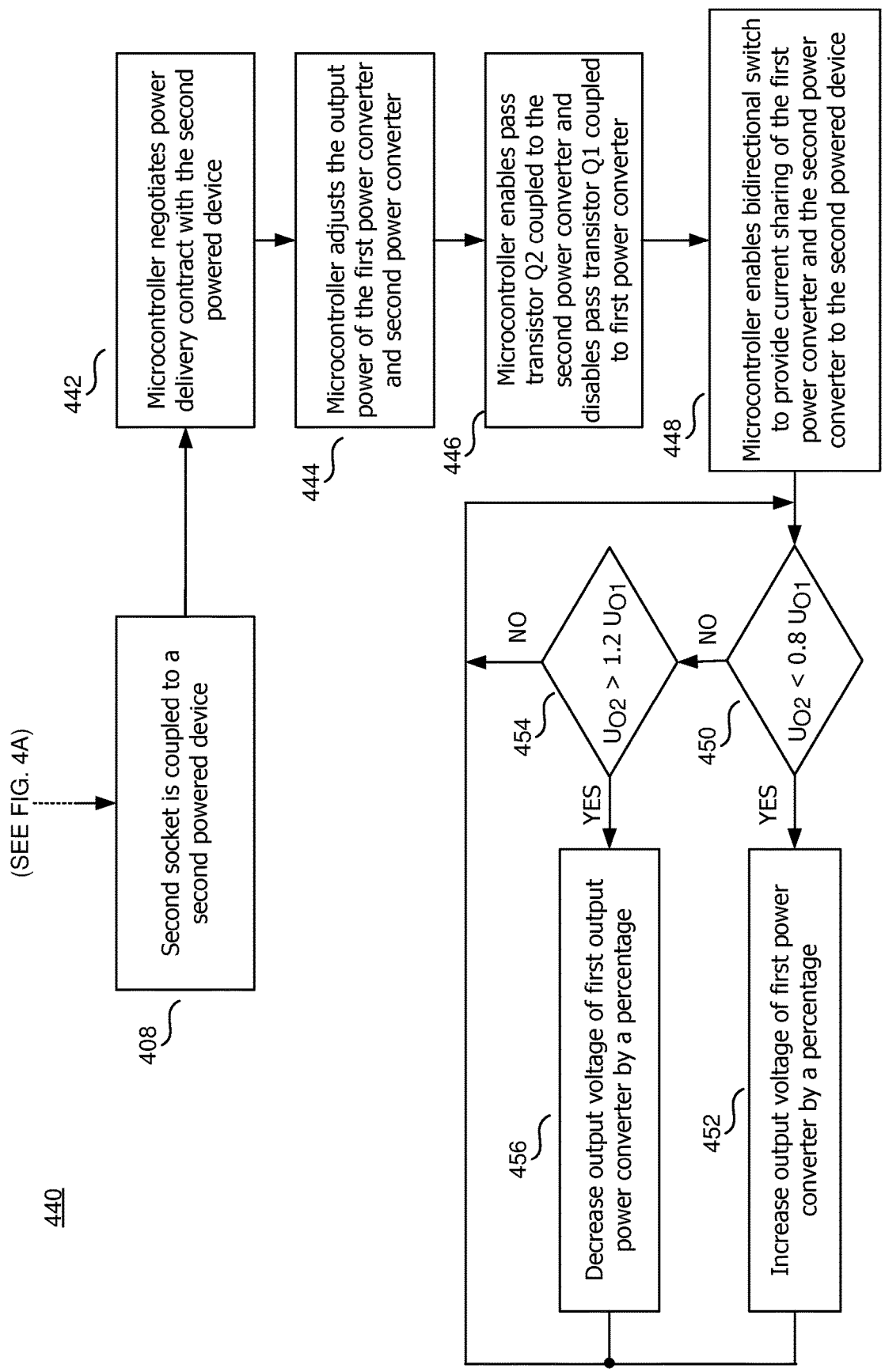
FIG. 4C illustrates another example of a flow diagram illustrating the operation of the charging device when a single socket is coupled to a powered device, in accordance with embodiments of the present disclosure.

FIG. 4C illustrates an example of a flow diagram illustrating the operation of the charging device only when the second socket is coupled to a powered device. Block 440 is a continuation of the flow diagram as shown in FIG. 4A. For reference, block 408 for the microcontroller determines the second socket is coupled to the powered device is reproduced for clarity. Process 400 proceeds to block 442. At block 442, the microcontroller negotiates a compatible power delivery contract with the powered device. Process 400 proceeds to block 444. At block 444, the microcontroller adjusts the output power of the first power converter and the second output converter. As mentioned previously, the microcontroller is configured to communicate to the first power converter controller and the second power controller to change the output power. Process 400 proceeds to block 446. At block 446, the microcontroller disables the first pass transistor (Q1) coupled to the first power converter. As mentioned previously, the microcontroller is configured to communicate to the first power converter controller to generate a signal to turn off the first pass transistor. Process 400 proceeds to block 448. At block 448, the microcontroller enables the bidirectional switch to provide current sharing of the first power converter and the second power converter to the powered device through the second socket. Process 400 proceeds to block 450. At decision block 450, the microcontroller compares the second output power and the first output power. If the second output power is less than eighty percent of the first output power, the microcontroller has determined these values are outside the hysteresis range. Process 400 proceeds to block 452. At block 452 the microcontroller communicates to the first power converter to increase the output voltage of the first power converter by a percentage. Process 400 loops back to decision block 450.

If the second output power is not less than eighty percent of the first output power, process 400 proceeds to decision block 454. At decision block 454, the microcontroller compares the second output power and the first output power. If the second output power is greater than one-hundred twenty percent of the first output power, the microcontroller has determined these values are outside the hysteresis range. Process 400 proceeds to block 456. At block 456 the microcontroller communicates to the first power converter to decrease the output voltage of the first power converter by a percentage. Process 400 loops back to decision block 450. At decision block 454, if the second output power is not greater than one-hundred twenty percent of the first output power, the microcontroller has determine these values are within the hysteresis range. Process 400 loops back to decision block 430.

Figure 4D:
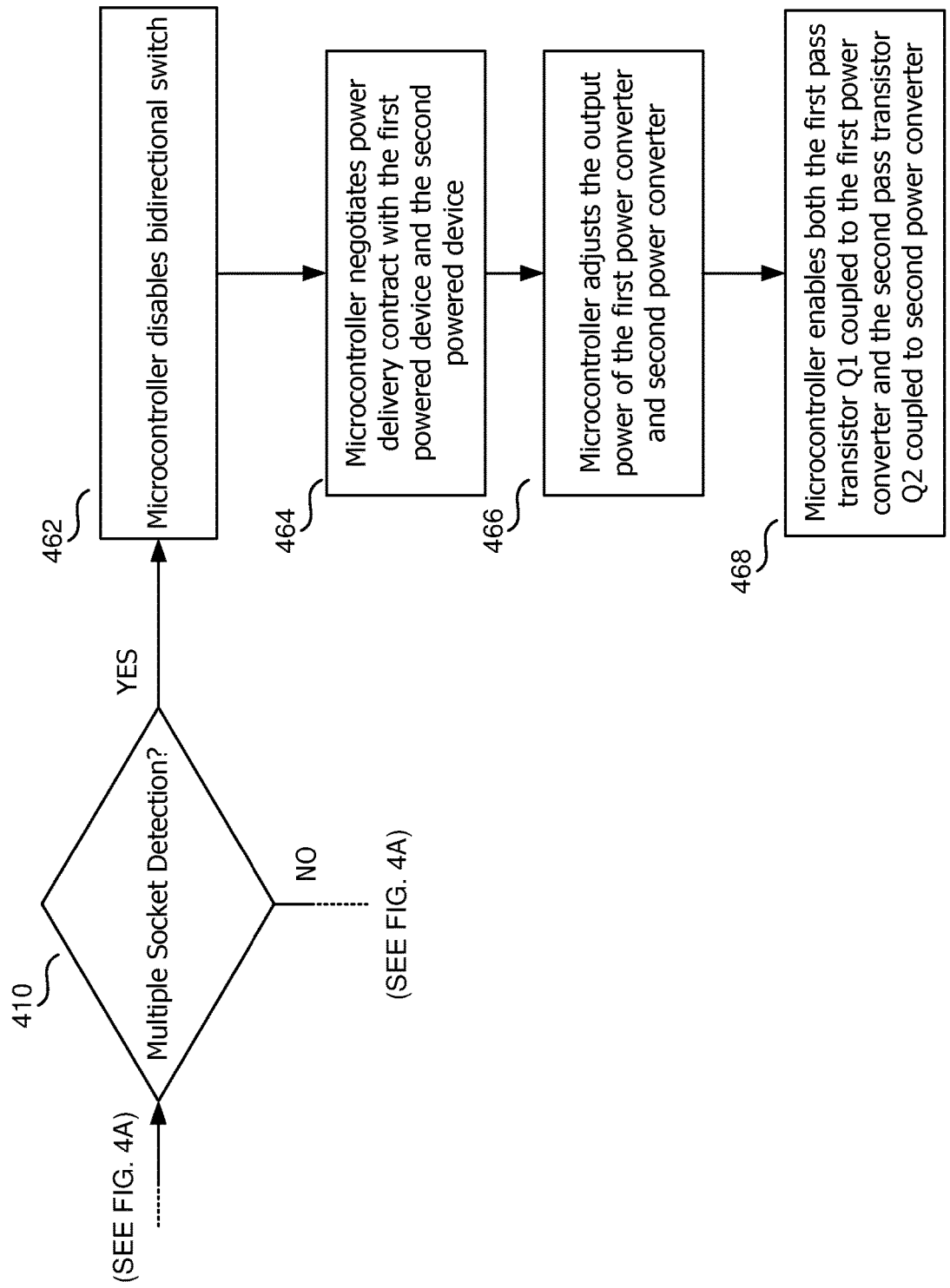
FIG. 4D illustrates an example of a flow diagram illustrating the operation of the charging device when multiple sockets are coupled to powered devices, in accordance with embodiments of the present disclosure.

FIG. 4D illustrates the process steps for block 460 of FIG. 4A after decision block 410. Decision block 410 is reproduced for clarity. At decision block 410, the microcontroller detects if multiple sockets of the charging device are connected to respective powered devices. If no, process 400 returns to decision block 404 shown in FIG. 4A. If yes, the process 400 continues to block 462.

At block 462, the microcontroller disables the bidirectional switch S1 and there is no current sharing between the first and second power converters. As such, each power converter is coupled to provide output power to their respective sockets and powered devices. Process 400 continues to block 464. At block 464, the microcontroller negotiates the power delivery contract with both the first powered device and the second powered device. The power delivery contract may be accomplished with configuration channels for the respective sockets/ports. Once the microcontroller has negotiated the power delivery contract, process 400 moves on to block 466.

At block 466, the microcontroller adjusts the regulated output power for both the first power converter and the second power converter of the charging device in response to the negotiated power delivery contract. The microcontroller can adjust the regulated output power by adjusting the regulated value of the output current, output voltage, or both of the respective power converter. At block 468, the microcontroller enables the first pass transistor Q1 coupled to the output of the first power converter and the second pass transistor Q2 coupled to the output of the second power converter.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

Although the present invention is defined in the claims, it should be understood that the present invention can alternatively be defined in accordance with the following examples:

Example 1. A multiple output power supply comprising: a first power converter configured to provide a first output power, the first power converter further configured to receive a communication signal to adjust the first output power; a second power converter configured to provide a second output power, the second power converter further configured to receive the communication signal to adjust the second output power; a bidirectional switch coupled between the first power converter and the second power converter; and a microcontroller coupled to the first power converter and the second power converter, the microcontroller configured to receive a first configuration channel signal from a first powered device, the microcontroller further configured to negotiate with the first powered device a total output power of the multiple output power supply, the microcontroller further configured to generate the communication signal to the first power converter and the second power converter to provide the total output power in accordance with the negotiation between the microcontroller and the first powered device, wherein the total output power is a sum of the first output power and the second output power, the microcontroller further configured to control the bidirectional switch such that the first power converter and the second power converter provide the total output power to the first powered device.

Example 2. The multiple output power supply of example 1, the second power converter coupled to a switch (Q2), the switch configured to provide the second output power from the second power converter to a second charging device.

Example 3. The multiple output power supply of any preceding example, the microcontroller further configured to disable the switch (Q2) in response to a turn on of the bidirectional switch.

Example 4. The multiple output power supply of any preceding example, the microcontroller further configured to adjust the first output power and the second output power to be equal within a hysteresis, wherein the hysteresis is that the first output power is greater than one-hundred twenty percent of the second output power.

Example 5. The multiple output power supply of any preceding example, the microcontroller further configured to adjust the first output power and the second output power to be equal within a hysteresis, wherein the hysteresis is that the first output power is less than eighty percent of the second output power.

Example 6. The multiple output power supply of any preceding example, the microcontroller further configured to adjust the first output power and the second output power to be equal within a hysteresis, wherein the hysteresis is that the second output power is greater than one-hundred twenty percent of the first output power.

Example 7. The multiple output power supply of any preceding example, the microcontroller further configured to adjust the first output power and the second output power to be equal within a hysteresis, wherein the hysteresis is that the second output power is less than eighty percent of the first output power.

Example 8. The multiple output power supply of any preceding example, the microcontroller further configured to receive a second configuration channel signal from a second powered device, the microcontroller further configured to negotiate the second output power with the second powered device, the microcontroller further configured to negotiate the first output power with the first powered device, the microcontroller further configured to generate the communication signal to the first power converter and the second power converter.

Example 9. The multiple output power supply of any preceding example, the microcontroller configured to turn off the bidirectional switch.

Example 10. The multiple output power supply of any preceding example, the second power converter coupled to a switch (Q2), the switch (Q2) configured to provide the second output power from the second power converter to the second powered device.

Example 11. The multiple output power supply of any preceding example, the first power converter coupled to a second switch, the second switch configured to provide the first output power from the first power converter to the first powered device.

Example 12. The multiple output power supply of any preceding example 1, the bidirectional switch comprising a first PMOS transistor, and a second PMOS transistor.

Example 13. The multiple output power supply of any preceding example, wherein the first power converter and the second power converter is a flyback converter.

Example 14. The multiple output power supply of any preceding example, the first power converter further comprising a first power converter controller, the first power converter controller configured to receive the communication signal from the microcontroller.

Example 15. The multiple output power supply of any preceding example, the second power converter further comprising a second power converter controller, the second power converter controller configured to receive the communication signal from the microcontroller.

Example 16. The multiple output power supply of any preceding example, the microcontroller configured to communicate the communication signal to the first power converter controller and the second power converter controller over an inter-integrated (I2C) circuit bus.

Example 17. A charging device, comprising: a first power converter configured to provide a first output power, the first power converter further configured to be regulated by a first controller; a second power converter configured to provide a second output power, the second power converter further configured to be regulated by a second controller; a switch coupled to the first power converter and the second power converter; a first socket coupled to the first power converter, the first socket configured to deliver the first output power from the first power converter to a first powered device; a second socket coupled to the second power converter, the second socket configured to deliver the second output power from the second power converter to a second powered device; and a power delivery (PD) controller configured to detect a coupling of the first socket to the first powered device, the PD controller further configured to detect an absence of coupling of the second socket to the second powered device, the PD controller further configured to control the switch to provide the first output power and the second output power to the first powered device.

Example 18. The charging device of example 17, the PD controller further configured to detect an absence of coupling of the first socket to the first powered device, the PD controller further configured to detect a coupling of the second socket to the second powered device, the PD controller further configured to control the switch to provide the first output power and the second output power to the second powered device.

Example 19. The charging device of example 17 or 18, the PD controller further configured to turn off the switch in response to the coupling of the first socket to the first powered device and to the coupling of the second socket to the second powered device.

Example 20. The charging device of any one of examples 17 to 19, the first socket comprising: a voltage bus terminal; a first configuration channel terminal; a second configuration channel terminal; and a first return terminal.

Example 21. The charging device of any one of examples 17 to 20, the second socket comprising: a voltage bus terminal; a third configuration channel terminal; a fourth configuration channel terminal; and a second return terminal.

Example 22. The charging device of any one of examples 17 to 21, the PD controller further configured to communicate to the first controller to change the first output power of the first power converter, wherein the first output power comprises a first output voltage and a first output current that can be adjusted by the first controller.

Example 23. The charging device of any one of examples 17 to 22, the PD controller further configured to communicate to the second controller to adjust the second output power of the second power converter, wherein the second output power comprises a second output voltage and a second output current that can be adjusted by the second controller.

Example 24. The charging device of any one of examples 17 to 23, the PD controller further configured to communicate to the first controller and the second controller via an inter-integrated (I2C) bus.

Example 25. The charging device of any one of examples 17 to 24, the first controller further comprising a first current comparator, the first current comparator configured to compare a first output current of the first power converter to a first current reference.

Example 26. The charging device of any one of examples 17 to 25, the PD controller further configured to adjust the first current reference of the first current comparator to change the first output current.

Example 27. The charging device of any one of examples 17 to 26, the second controller further comprising a second current comparator, the second current comparator configured to compare a second output current of the second power converter to a second current reference.

Example 28. The charging device of any one of examples 17 to 27, the PD controller further configured to adjust the second current reference of the second current comparator to change the second output current.

Example 29. The charging device of any one of examples 17 to 28, the first controller further comprising a first voltage comparator, the first voltage comparator configured to compare a first output voltage of the first power converter to a first voltage reference.

Example 30. The charging device of any one of examples 17 to 29, the PD controller configured to adjust the first voltage reference of the first voltage comparator to change the first output voltage.

Example 31. The charging device of any one of examples 17 to 30, the second controller further comprising a second voltage comparator, the second voltage comparator configured to compare a second output voltage of the second power converter to a second voltage reference.

Example 32. The charging device of any one of examples 17 to 31, the PD controller configured to adjust the second voltage reference of the second voltage comparator to change the second output voltage.

Example 33. The charging device of any one of examples 17 to 32, further comprising a first pass transistor, wherein the first pass transistor is configured to be turned on by the PD controller in response to the coupling of the first socket to the first powered device.

Example 34. The charging device of any one of examples 17 to 33, further comprising a second pass transistor, wherein the second pass transistor is configured to be turned off by the PD controller in response to the coupling of the first socket to the first powered device and the absence of coupling of the second socket to the second powered device.

Example 35. The charging device of any one of examples 17 to 34, further comprising a second pass transistor, wherein the second pass transistor is configured to be turned on by the PD controller in response to the coupling of the second socket to the second powered device.

Example 36. The charging device of any one of examples 17 to 35, wherein the first pass transistor is configured to be turned off by the PD controller in response to the coupling of the second socket to the second powered device, and the absence of coupling of the first socket to the first powered device.

Example 37. A method for providing power from a charging device to one or more powered devices, the method comprising: detecting a coupling of a first socket to a first powered device; detecting an absence of coupling of a second socket to a second powered device; negotiating a power delivery contract from the charging device to the first powered device; adjusting a first output power of a first power converter; adjusting a second output power of a second power converter; disabling a switch coupled to the second power converter; enabling a bidirectional switch to provide a shared output power, the bidirectional switch coupled to the first power converter, the bidirectional switch further coupled to the second power converter, wherein the shared output power is a combination of the first output power and the second output power; and enabling a second switch coupled to the first power converter to provide the shared output power in accordance with the power delivery contract to the first powered device.

Example 38. A method for providing power from a charging device to one or more powered devices, the method comprising: detecting a coupling of a first socket to a first powered device; detecting a coupling of a second socket to a second powered device; disabling a bidirectional switch, the bidirectional switch configured to prevent current sharing of the first power converter and the second power converter; negotiating a first power delivery contract from the charging device to the first powered device; negotiating a second first power delivery contract from the charging device to the second powered device; adjusting a first output power of a first power converter in accordance to the first power delivery contract; adjusting a second output power of a second power converter in accordance to the second power delivery contract; enabling a first switch coupled to the first power converter; and enabling a switch coupled to the second power converter.

What is claimed is:

1. A multiple output power supply comprising:
   a first power converter configured to provide a first output power, the first power converter further configured to receive a communication signal to adjust the first output power;
   a second power converter configured to provide a second output power, the second power converter further configured to receive the communication signal to adjust the second output power;
   a bidirectional switch coupled between the first power converter and the second power converter; and
   a microcontroller coupled to the first power converter and the second power converter, the microcontroller configured to receive a first configuration channel signal from a first powered device, the microcontroller further configured to negotiate with the first powered device a total output power of the multiple output power supply, the microcontroller further configured to generate the communication signal to the first power converter and the second power converter to provide the total output power in accordance with the negotiation between the microcontroller and the first powered device, wherein the total output power is a sum of the first output power and the second output power, the microcontroller further configured to control the bidirectional switch such that the first power converter and the second power converter provide the total output power to the first powered device.

2. The multiple output power supply of claim 1, the second power converter coupled to a switch (Q2), the switch configured to provide the second output power from the second power converter to a second charging device.

3. The multiple output power supply of claim 2, the microcontroller further configured to disable the switch (Q2) in response to a turn on of the bidirectional switch.

4. The multiple output power supply of claim 3, the microcontroller further configured to adjust the first output power and the second output power to be equal within a hysteresis, wherein the hysteresis is that the first output power is greater than one-hundred twenty percent of the second output power.

5. The multiple output power supply of claim 4, the microcontroller further configured to adjust the first output power and the second output power to be equal within a hysteresis, wherein the hysteresis is that the first output power is less than eighty percent of the second output power.

6. The multiple output power supply of claim 5, the microcontroller further configured to adjust the first output power and the second output power to be equal within a hysteresis, wherein the hysteresis is that the second output power is less than eighty percent of the first output power.

7. The multiple output power supply of claim 4, the microcontroller configured to turn off the bidirectional switch.

8. The multiple output power supply of claim 3, the microcontroller further configured to adjust the first output power and the second output power to be equal within a hysteresis, wherein the hysteresis is that the second output power is greater than one-hundred twenty percent of the first output power.

9. The multiple output power supply of claim 1, the microcontroller further configured to receive a second configuration channel signal from a second powered device, the microcontroller further configured to negotiate the second output power with the second powered device, the microcontroller further configured to negotiate the first output power with the first powered device, the microcontroller further configured to generate the communication signal to the first power converter and the second power converter.

10. The multiple output power supply of claim 9, the second power converter coupled to a switch (Q2), the switch (Q2) configured to provide the second output power from the second power converter to the second powered device.

11. The multiple output power supply of claim 9, the first power converter coupled to a second switch, the second switch configured to provide the first output power from the first power converter to the first powered device.

12. The multiple output power supply of claim 1, the bidirectional switch comprising a first PMOS transistor, and a second PMOS transistor.

13. The multiple output power supply of claim 1, wherein the first power converter and the second power converter is a flyback converter.

14. The multiple output power supply of claim 1, the first power converter further comprising a first power converter controller, the first power converter controller configured to receive the communication signal from the microcontroller.

15. The multiple output power supply of claim 14, the second power converter further comprising a second power converter controller, the second power converter controller configured to receive the communication signal from the microcontroller.

16. The multiple output power supply of claim 15, the microcontroller configured to communicate the communication signal to the first power converter controller and the second power converter controller over an inter-integrated (I2C) circuit bus.

17. A charging device, comprising:
a first power converter configured to provide a first output power, the first power converter further configured to be regulated by a first controller;
a second power converter configured to provide a second output power, the second power converter further configured to be regulated by a second controller;
a switch coupled to the first power converter and the second power converter;
a first socket coupled to the first power converter, the first socket configured to deliver the first output power from the first power converter to a first powered device;
a second socket coupled to the second power converter, the second socket configured to deliver the second output power from the second power converter to a second powered device; and
a power delivery (PD) controller configured to detect a coupling of the first socket to the first powered device, the PD controller further configured to detect an absence of coupling of the second socket to the second powered device, the PD controller further configured to control the switch to provide the first output power and the second output power to the first powered device.

18. The charging device of claim 17, the PD controller further configured to detect an absence of coupling of the first socket to the first powered device, the PD controller further configured to detect a coupling of the second socket to the second powered device, the PD controller further configured to control the switch to provide the first output power and the second output power to the second powered device.

19. The charging device of claim 18, the PD controller further configured to turn off the switch in response to the coupling of the first socket to the first powered device and to the coupling of the second socket to the second powered device.

20. The charging device of claim 19, the first socket comprising:
a voltage bus terminal;
a first configuration channel terminal;
a second configuration channel terminal; and
a first return terminal.

21. The charging device of claim 20, the second socket comprising:
a voltage bus terminal;
a third configuration channel terminal;
a fourth configuration channel terminal; and
a second return terminal.

22. The charging device of claim 18, further comprising a second pass transistor, wherein the second pass transistor is configured to be turned off by the PD controller in response to the coupling of the first socket to the first powered device and the absence of coupling of the second socket to the second powered device.

23. The charging device of claim 17, the PD controller further configured to communicate to the first controller to change the first output power of the first power converter, wherein the first output power comprises a first output voltage and a first output current that can be adjusted by the first controller.

24. The charging device of claim 23, the PD controller further configured to communicate to the second controller to adjust the second output power of the second power converter, wherein the second output power comprises a second output voltage and a second output current that can be adjusted by the second controller.

25. The charging device of claim 24, the PD controller further configured to communicate to the first controller and the second controller via an inter-integrated (I2C) bus.

26. The charging device of claim 17, the first controller further comprising a first current comparator, the first current comparator configured to compare a first output current of the first power converter to a first current reference.

27. The charging device of claim 26, the PD controller further configured to adjust the first current reference of the first current comparator to change the first output current.

28. The charging device of claim 17, the second controller further comprising a second current comparator, the second current comparator configured to compare a second output current of the second power converter to a second current reference.

29. The charging device of claim 28, the PD controller further configured to adjust the second current reference of the second current comparator to change the second output current.

30. The charging device of claim 17, the first controller further comprising a first voltage comparator, the first voltage comparator configured to compare a first output voltage of the first power converter to a first voltage reference.

31. The charging device of claim 30, the PD controller configured to adjust the first voltage reference of the first voltage comparator to change the first output voltage.

32. The charging device of claim 17, the second controller further comprising a second voltage comparator, the second voltage comparator configured to compare a second output voltage of the second power converter to a second voltage reference.

33. The charging device of claim 32, the PD controller configured to adjust the second voltage reference of the second voltage comparator to change the second output voltage.

34. The charging device of claim 17, further comprising a first pass transistor, wherein the first pass transistor is configured to be turned on by the PD controller in response to the coupling of the first socket to the first powered device.

35. The charging device of claim 34, further comprising a second pass transistor, wherein the second pass transistor is configured to be turned on by the PD controller in response to the coupling of the second socket to the second powered device.

36. The charging device of claim 35, wherein the first pass transistor is configured to be turned off by the PD controller in response to the coupling of the second socket to the second powered device, and the absence of coupling of the first socket to the first powered device.

37. A method for providing power from a charging device to one or more powered devices, the method comprising:
detecting a coupling of a first socket to a first powered device;
detecting an absence of coupling of a second socket to a second powered device;
negotiating a power delivery contract from the charging device to the first powered device;
adjusting a first output power of a first power converter;
adjusting a second output power of a second power converter;
disabling a switch coupled to the second power converter;
enabling a bidirectional switch to provide a shared output power, the bidirectional switch coupled to the first power converter, the bidirectional switch further coupled to the second power converter, wherein the shared output power is a combination of the first output power and the second output power; and
enabling a second switch coupled to the first power converter to provide the shared output power in accordance with the power delivery contract to the first powered device.

38. A method for providing power from a charging device to one or more powered devices, the method comprising:
detecting a coupling of a first socket to a first powered device;
detecting a coupling of a second socket to a second powered device;
disabling a bidirectional switch, the bidirectional switch configured to prevent current sharing of the first power converter and the second power converter;
negotiating a first power delivery contract from the charging device to the first powered device;
negotiating a second first power delivery contract from the charging device to the second powered device;
adjusting a first output power of a first power converter in accordance to the first power delivery contract;
adjusting a second output power of a second power converter in accordance to the second power delivery contract;
enabling a first switch coupled to the first power converter; and
enabling a switch coupled to the second power converter.

* * * * *